May 6, 1958 C. A. CHRISTOFF ET AL 2,833,467

CALCULATING MACHINE, INCLUDING ORDINALLY SHIFTABLE FACTOR STORAGE AND VALUE ENTRY CONTROL DEVICES

Filed Nov. 16, 1953 17 Sheets-Sheet 1

INVENTORS,
Chris A. Christoff &
Robert E. Boyden

BY

ATTORNEY.

May 6, 1958 C. A. CHRISTOFF ET AL 2,833,467

CALCULATING MACHINE, INCLUDING ORDINALLY SHIFTABLE FACTOR STORAGE AND VALUE ENTRY CONTROL DEVICES

Filed Nov. 16, 1953 17 Sheets-Sheet 2

INVENTORS,
Chris A. Christoff &
Robert E. Boyden
BY
[signature]
ATTORNEY.

May 6, 1958 C. A. CHRISTOFF ET AL 2,833,467

CALCULATING MACHINE, INCLUDING ORDINALLY SHIFTABLE FACTOR STORAGE AND VALUE ENTRY CONTROL DEVICES

Filed Nov. 16, 1953 17 Sheets-Sheet 3

INVENTORS,
Chris A. Christoff &
Robert E. Boyden

BY [signature]
ATTORNEY.

May 6, 1958 C. A. CHRISTOFF ET AL 2,833,467

CALCULATING MACHINE, INCLUDING ORDINALLY SHIFTABLE FACTOR STORAGE AND VALUE ENTRY CONTROL DEVICES

Filed Nov. 16, 1953 17 Sheets-Sheet 4

INVENTORS,
Chris A. Christoff &
Robert E. Boyden
BY
Paul N. Schwend
ATTORNEY.

INVENTORS,
Chris A. Christoff &
Robert E. Boyden
BY [signature]
ATTORNEY.

INVENTORS,
Chris A. Christoff &
Robert E. Boyden
BY
ATTORNEY.

CALCULATING MACHINE, INCLUDING ORDINALLY SHIFTABLE FACTOR STORAGE AND VALUE ENTRY CONTROL DEVICES

Filed Nov. 16, 1953 17 Sheets-Sheet 7

INVENTORS,
Chris A. Christoff &
Robert E. Boyden
BY [signature]
ATTORNEY.

May 6, 1958 C. A. CHRISTOFF ET AL 2,833,467

CALCULATING MACHINE, INCLUDING ORDINALLY SHIFTABLE FACTOR STORAGE AND VALUE ENTRY CONTROL DEVICES

Filed Nov. 16, 1953 17 Sheets-Sheet 8

INVENTORS,
Chris A. Christoff &
Robert E. Boyden

BY

ATTORNEY.

CALCULATING MACHINE, INCLUDING ORDINALLY SHIFTABLE FACTOR STORAGE AND VALUE ENTRY CONTROL DEVICES

INVENTORS,
Chris A. Christoff &
Robert E. Boyden
BY
ATTORNEY.

INVENTORS,
Chris A. Christoff &
Robert E. Boyden
BY
Fred N. Schwend
ATTORNEY.

INVENTORS,
Chris A. Christoff &
BY Robert E. Boyden
[signature]
ATTORNEY.

INVENTORS,
Chris A. Christoff &
BY Robert E. Boyden
ATTORNEY.

INVENTORS,
Chris A. Christoff &
Robert E. Boyden
BY
[signature]
ATTORNEY.

INVENTORS.
Chris A. Christoff &
Robert E. Boyden
BY [signature]
ATTORNEY.

May 6, 1958 C. A. CHRISTOFF ET AL 2,833,467

CALCULATING MACHINE, INCLUDING ORDINALLY SHIFTABLE FACTOR STORAGE AND VALUE ENTRY CONTROL DEVICES

Filed Nov. 16, 1953 17 Sheets-Sheet 15

INVENTORS,
Chris A. Christoff &
Robert E. Boyden

BY [signature]

ATTORNEY.

May 6, 1958 C. A. CHRISTOFF ET AL 2,833,467

CALCULATING MACHINE, INCLUDING ORDINALLY SHIFTABLE FACTOR STORAGE AND VALUE ENTRY CONTROL DEVICES

Filed Nov. 16, 1953 17 Sheets-Sheet 16

INVENTORS,
Chris A. Christoff &
BY Robert E. Boyden
Paul B. Schwend
ATTORNEY.

INVENTORS,
Chris A. Christoff &
Robert E. Boyden
BY
[signature]
ATTORNEY.

United States Patent Office 2,833,467
Patented May 6, 1958

2,833,467

CALCULATING MACHINE, INCLUDING ORDINALLY SHIFTABLE FACTOR STORAGE AND VALUE ENTRY CONTROL DEVICES

Chris A. Christoff and Robert E. Boyden, San Gabriel, Calif., assignors to Clary Corporation, a corporation of California Application November 16, 1953, Serial No. 392,294

12 Claims. (Cl. 235—60)

This invention relates to calculating machines of the type capable of performing the four cardinal calculations; i. e., addition, subtraction, multiplication and division, and including instrumentalities for recording the factors and results of such calculations.

Normally, cyclically operable calculating machines of a mechanical nature capable of performing such calculations as multiplication and division embody relatively shiftable differential actuators and registers, or relatively shiftable amount entry devices and actuators in order to facilitate the calculation process and to reduce to a minimum the number of cycles required to solve different problems.

In the above types of mechanical calculating machines the width of the machine, or at least certain portions thereof, must be increased materially beyond the width of the actuator section in order to provide for relative shifting of the amount entry devices and the actuators or relative shifting of the register and the actuators. For example, ten key amount entry devices have been employed heretofore for effecting relative shifting, such entry devices including a pin carriage having actuator stop pins selectively settable by a group of ten keys. The pin carriage is shiftable in a step by step movement across a group of actuators. In order to permit traverse of the pin carriage across a whole group of actuators and yet maintain the machine within acceptable limits of width, the actuators must be spaced very close to each other, thus imposing a considerable hardship from the standpoint of design and service due to the close spacing of such parts. For example, lateral tolerances of the parts, such as amount entry devices, accumulator, etc., must be reduced correspondingly, and must be maintained accordingly.

Therefore, it is a principal object of the present invention to provide, in a mechanical calculating machine, a relatively shiftable amount entry device and a group of actuators without extending the width of the machine materially beyond the width of the actuator group.

Another object of the invention is to render a calculating machine of the foregoing type more flexible in operation and capable of solving a wide variety of problems.

Another object is to provide a calculating machine capable of multiplying and dividing and of recording the factors and results of such calculations in sequence, without recording intermediate results or data of such calculations.

Another object is to increase the speed of mechanical calculators.

Another object is to provide a recording calculating machine capable of chain calculations, such as chain multiplication.

A further object is to provide a recording, calculating machine capable of recording the factors and results of multiplication, division, etc,, calculations in decimally aligned sequence.

A further object is to modify a recording, adding and subtracting machine to facilitate solving of problems in multiplication and division.

The manner in which the above and other objects of the invention are accomplished will be readily understood on reference to the following specification when read in conjunction with the accompanying drawings, wherein:

Fig. 1 is a plan view of a machine embodying a preferred form of the present invention.

Fig. 2 is a partial longitudinal sectional view through the machine which, combined with Fig. 5, is taken along the line 2:5—2:5 of Fig. 1 and also line 2—2 of Figs. 26 and 28.

Figures 9, 10, 10A:
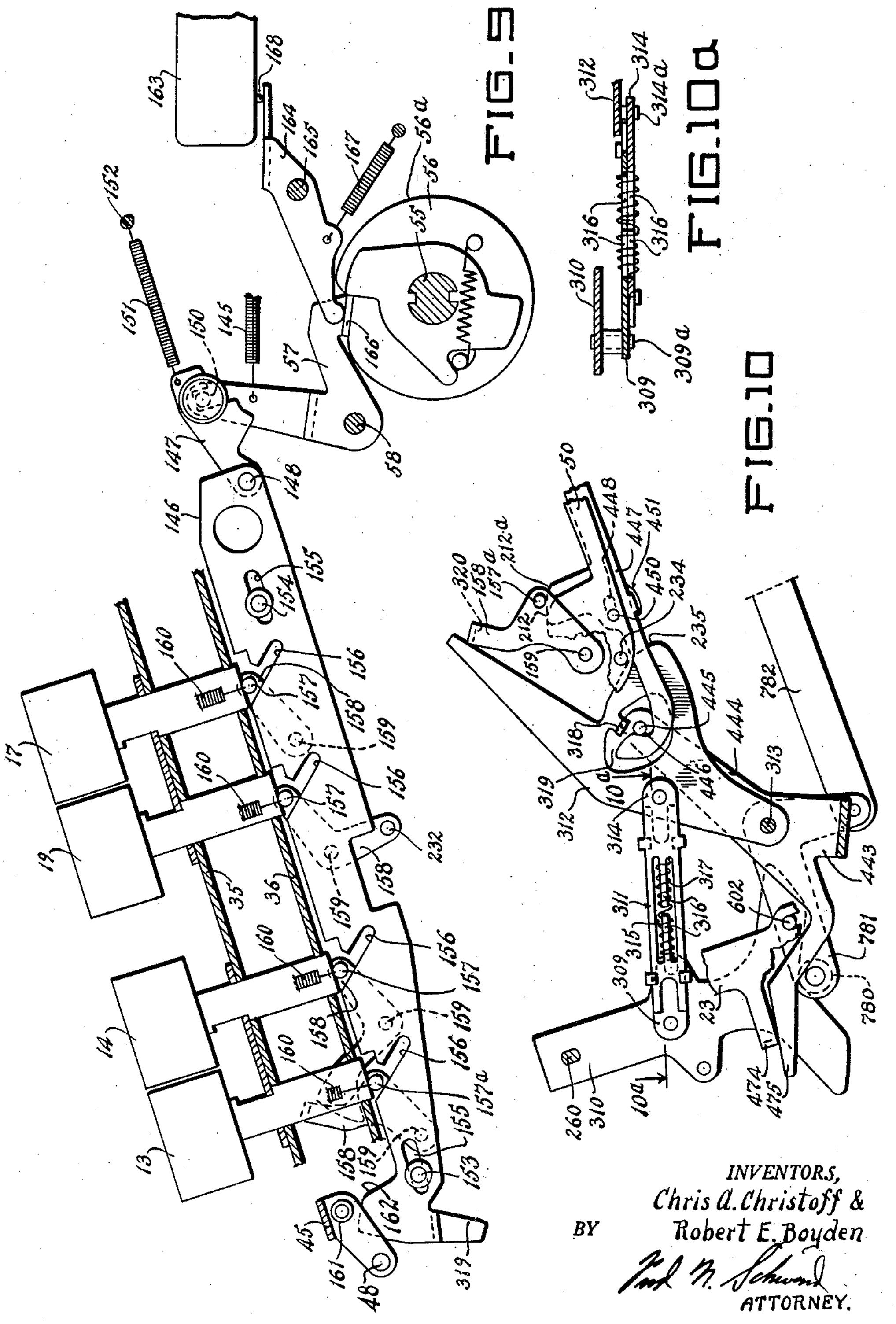
Fig. 9 is a sectional side elevational view taken along the left-hand side of the machine and illustrating the motor and clutch controls.
Fig. 10 is a side elevational view illustrating the clutch and accumulator controls associated with the multiply-divide lever.

Fig. 10*a* is a sectional plan of a link taken on the line **10*a*—10*a*** of Fig. 10.

Figures 11, 12, 13:
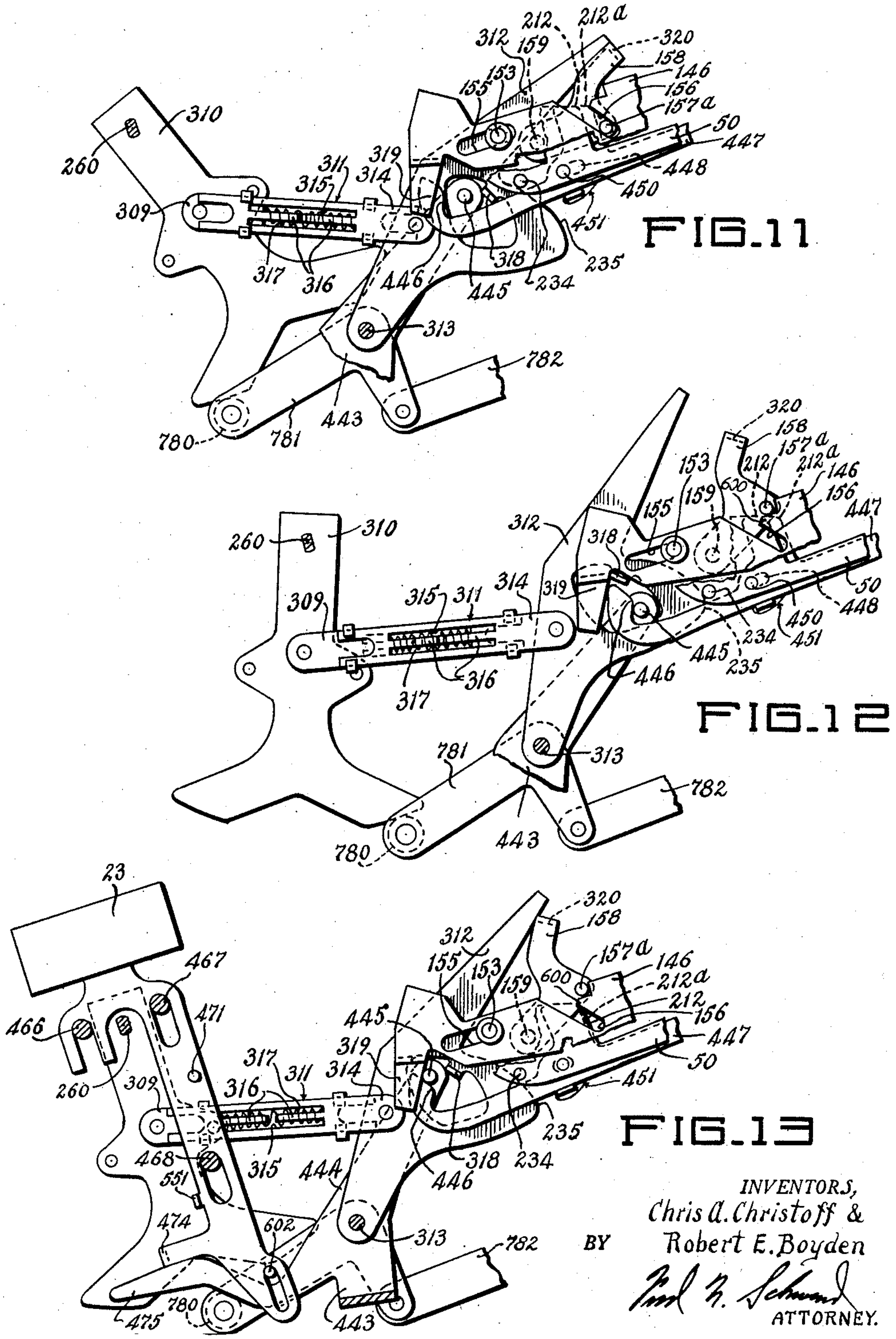

Figs. 11, 12 and 13 are similar to Fig. 10 but illustrate the mechanism in different conditions.

Figures 14, 15, 16:
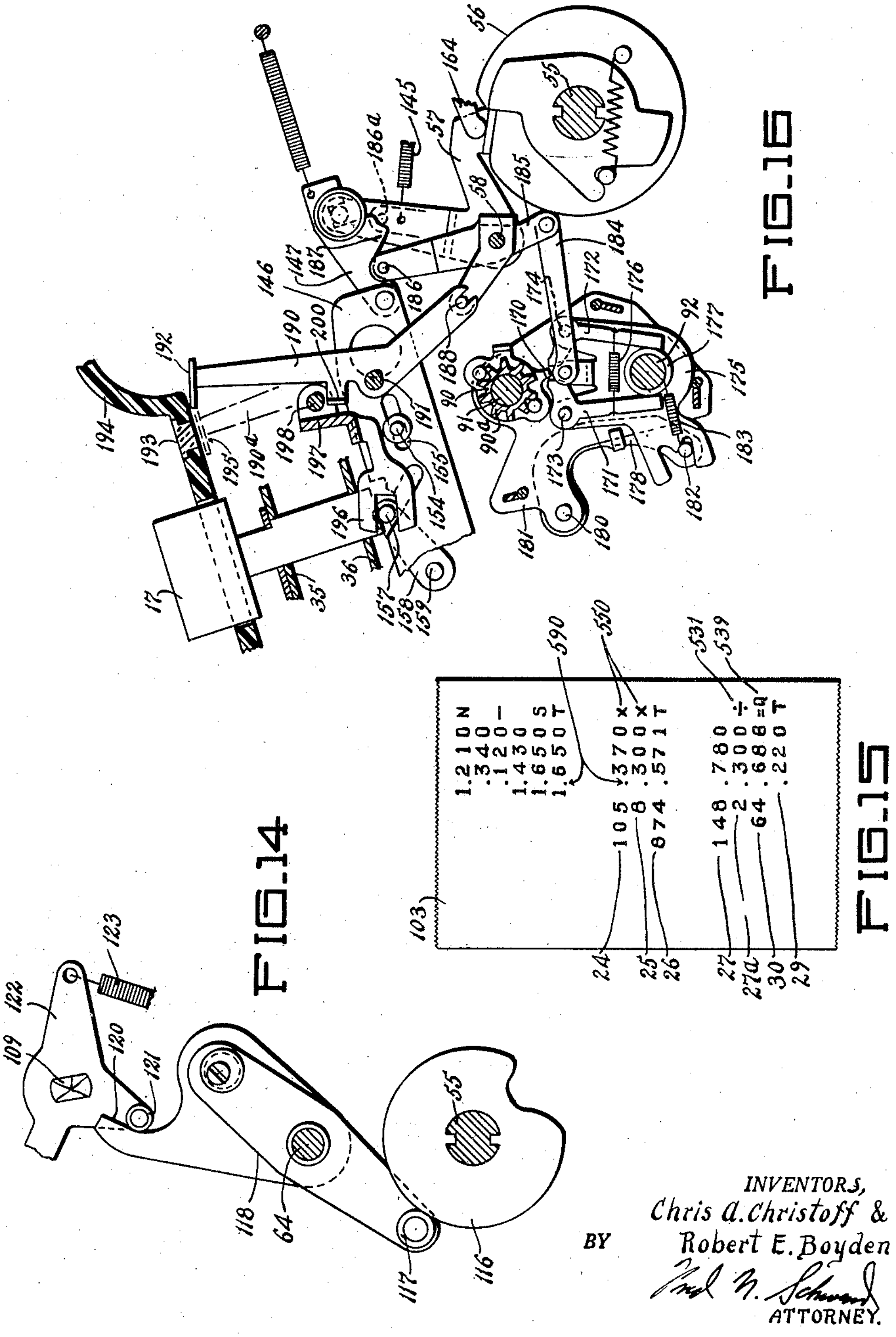

Fig. 14 is a side view of the printer control mechanism.

Fig. 15 is a view of a sample tape having recorded thereon the factors and results of different types of computation performed by the machine.

Fig. 16 is a fragmentary side elevational view illustrating the overdraft controls for arresting operation of the machine.

Figures 17, 30, 31, 32:
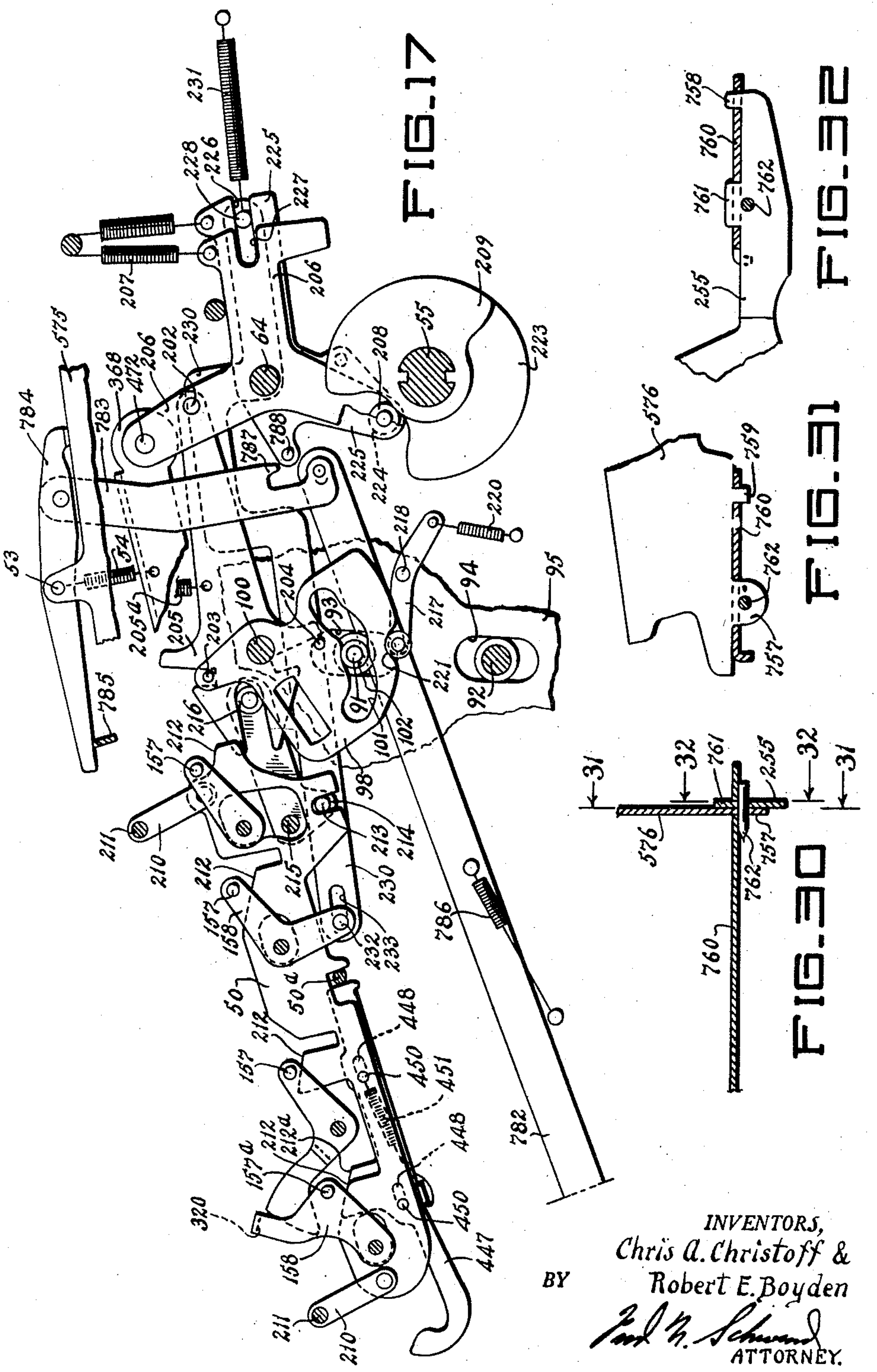

Fig. 17 is a side elevational view, taken along the left-hand side of the machine, illustrating the accumulator positioning controls.

Figures 18, 19, 20:
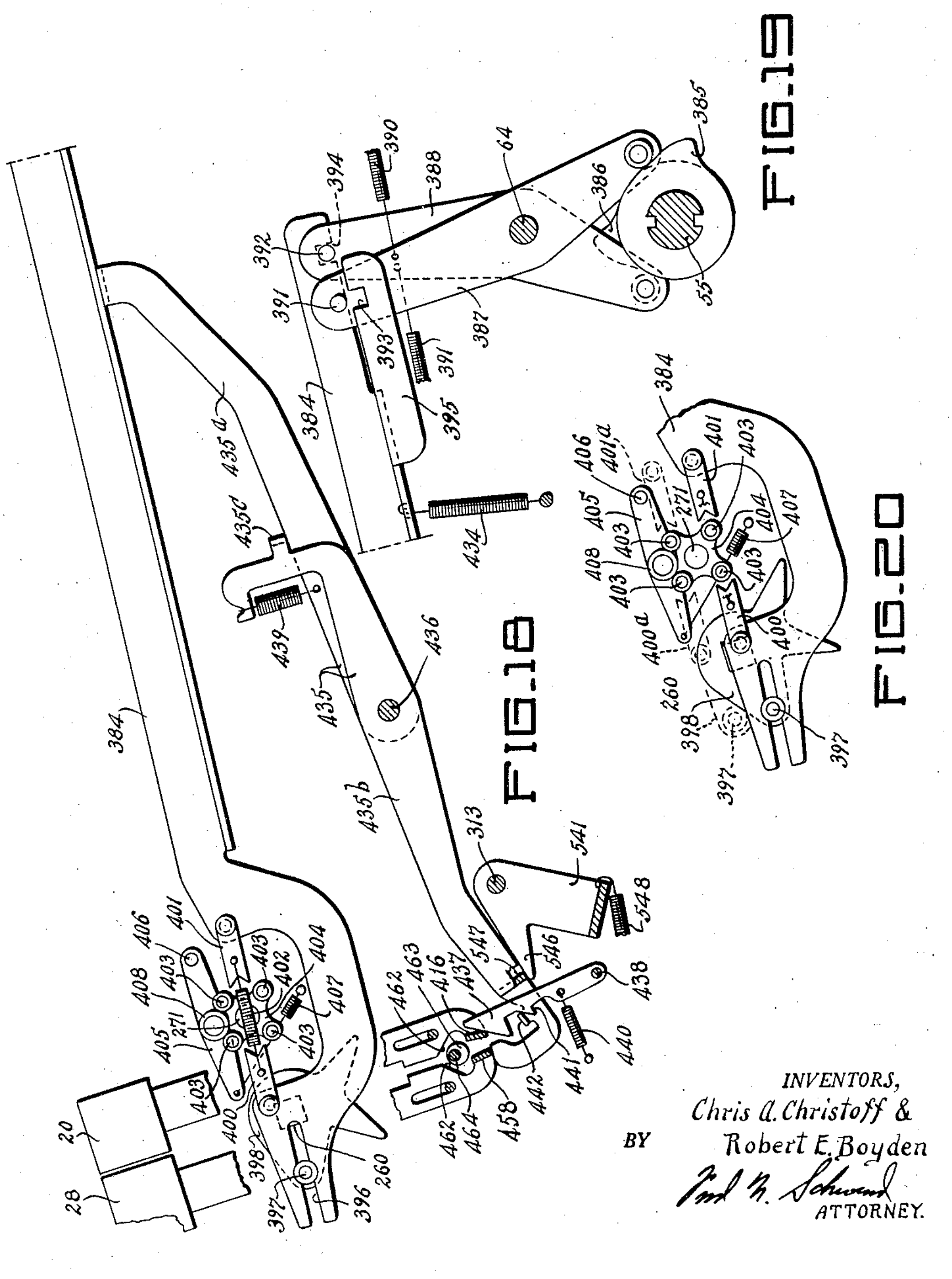

Fig. 18 is an elevational view, taken along the right-hand side of the machine, illustrating the multiplier-quotient counter actuating mechanism in a neutral position.

Fig. 19 is a side view of the cams and cam followers operatively associated with the counter actuator of Fig. 18.

Fig. 20 is a view similar to that of Fig. 18 but showing the counter actuator in an alternate position.

Figures 21, 22, 23:
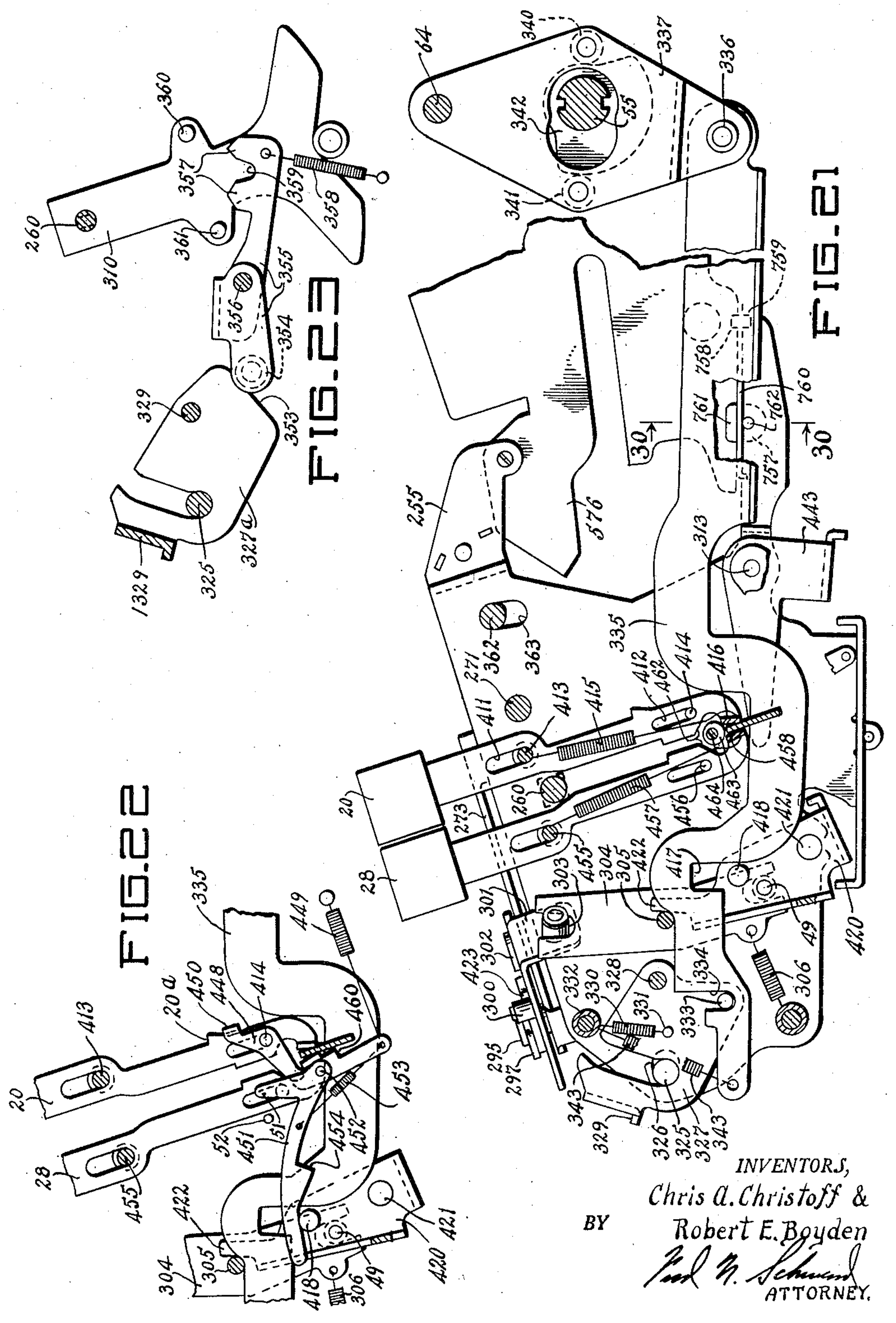

Fig. 21 is a side view, taken along the right-hand side of the machine, illustrating part of the controls for the multiply-divide control mechanism.

Fig. 22 is a fragmentary view illustrating the means for latching the divisor entry and the multiplicand entry keys in depressed positions.

Figure 28:
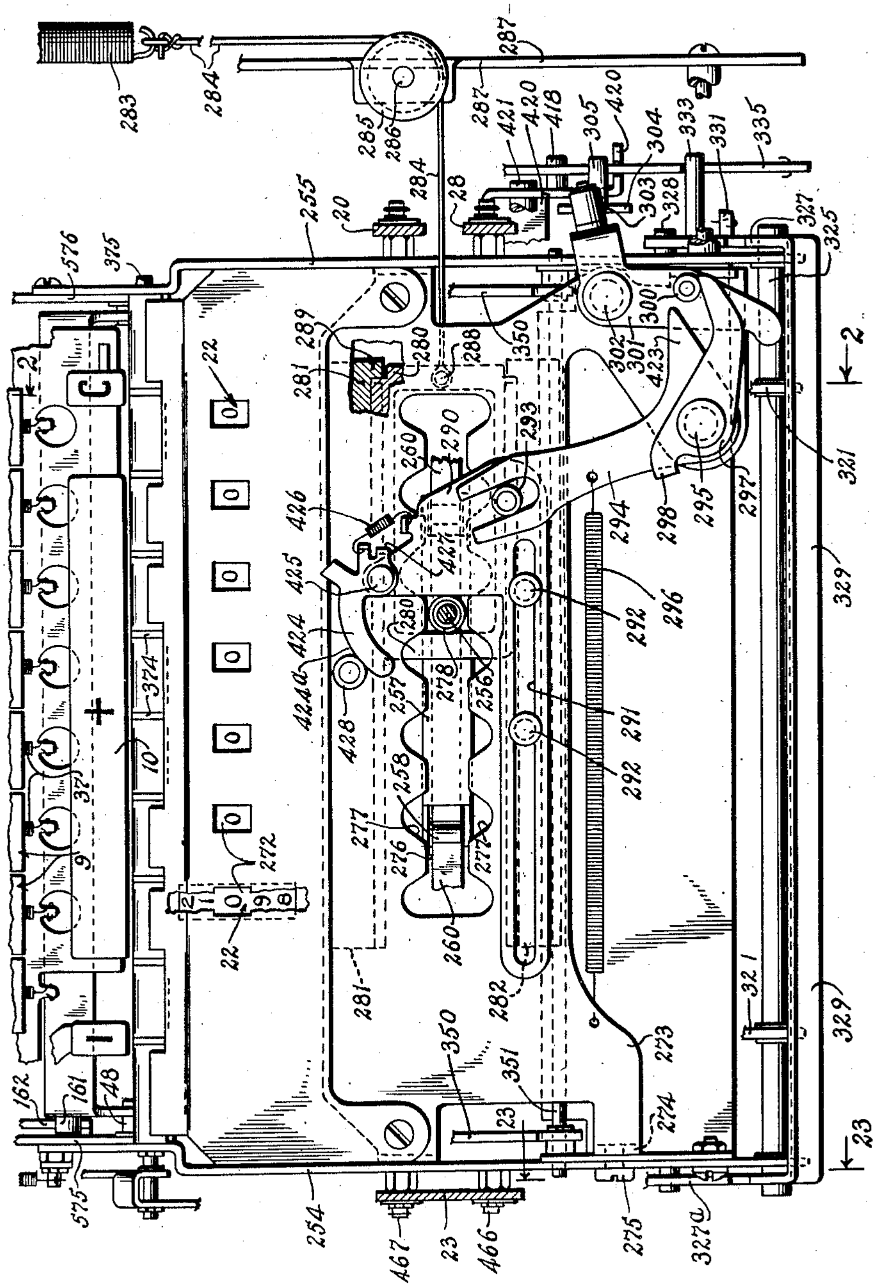

Fig. 23 is a sectional view taken along the line 23—23 of Fig. 28 illustrating the multiply-divide handle locating mechanism.

Figures 24, 25:
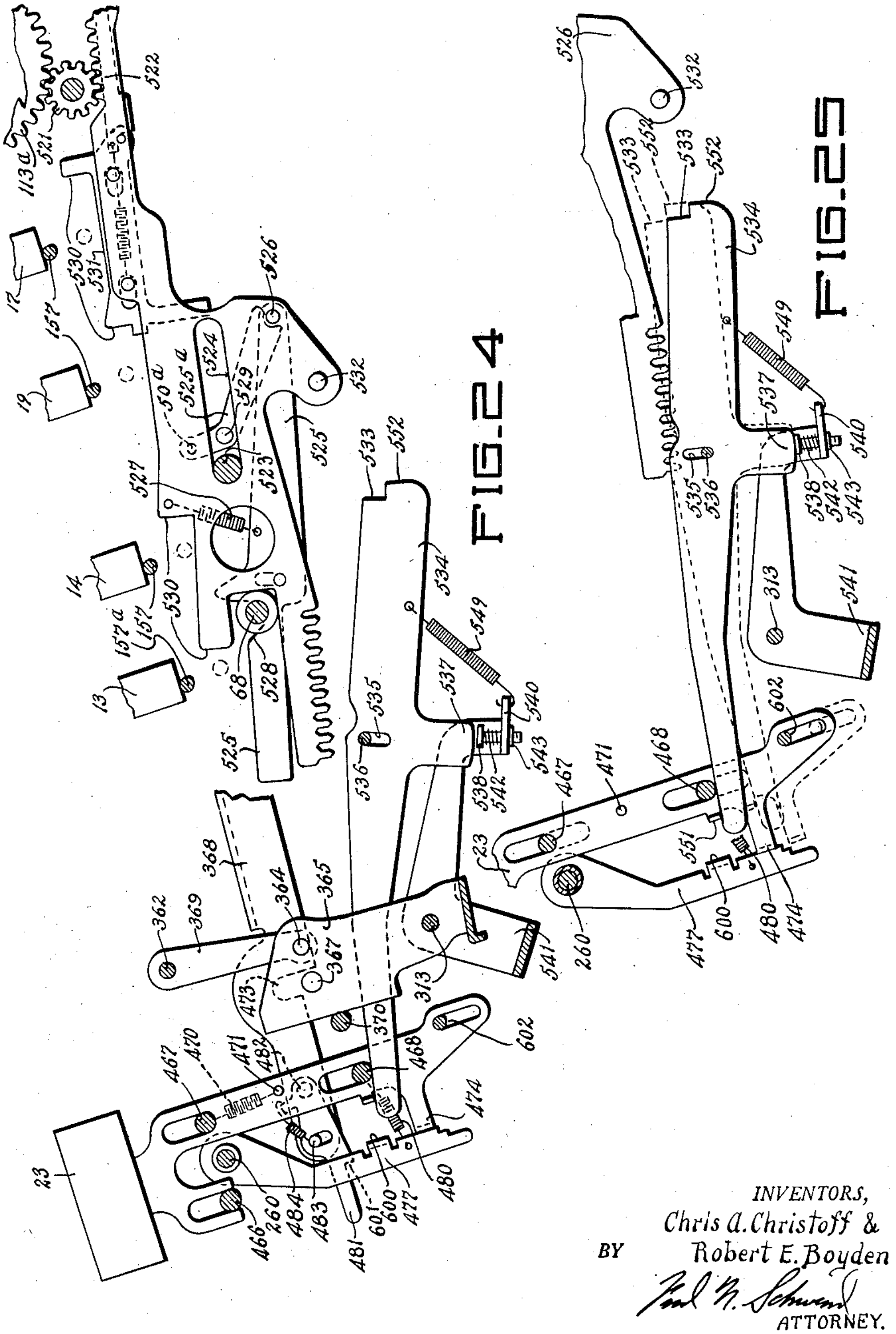

Fig. 24 is a side view, taken along the left-hand side of the machine, illustrating part of the symbol printing mechanism.

Fig. 25 is a view of part of the mechanism shown in Fig. 24, illustrating the same in alternate positions.

Figures 2, 3, 4:
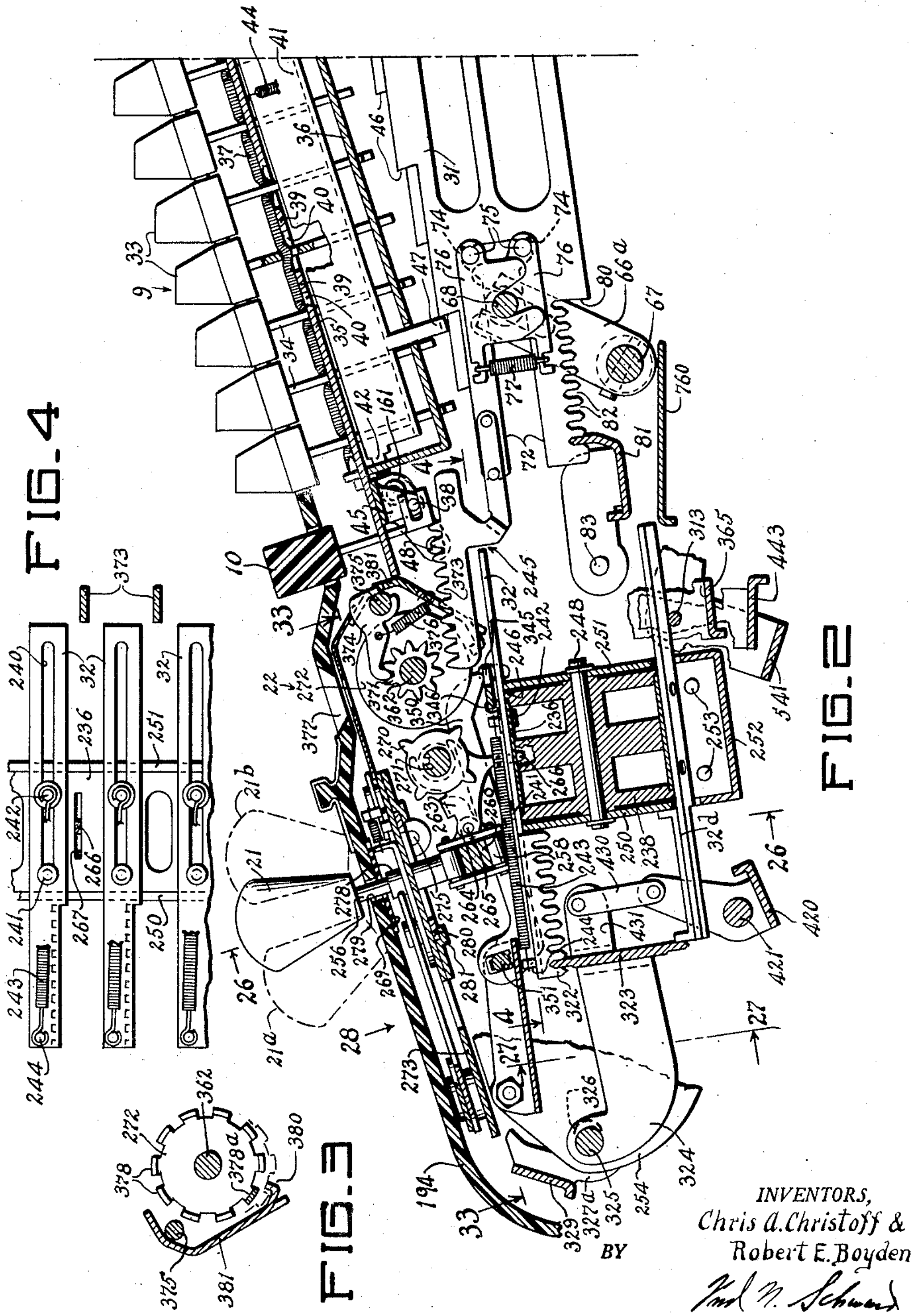
Fig. 3 is a transverse sectional view through the multiplier-quotient counter and is taken along the line 3—3 of Fig. 33.
Fig. 4 is a sectional plan view illustrating the multiplicand divisor slide construction and is taken substantially along the line 4—4 of Fig. 2.
Figure 26:
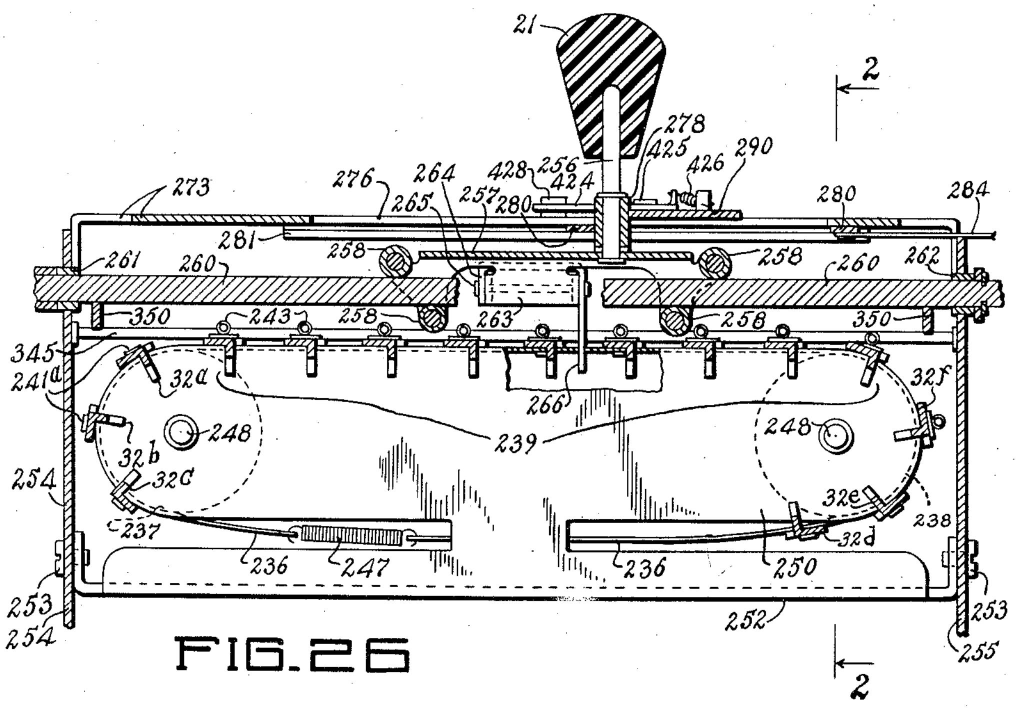

Fig. 26 is a sectional view through the multiply-divide control mechanism and is taken substantially along the lines 26—26 of Fig. 2.

Figure 27:
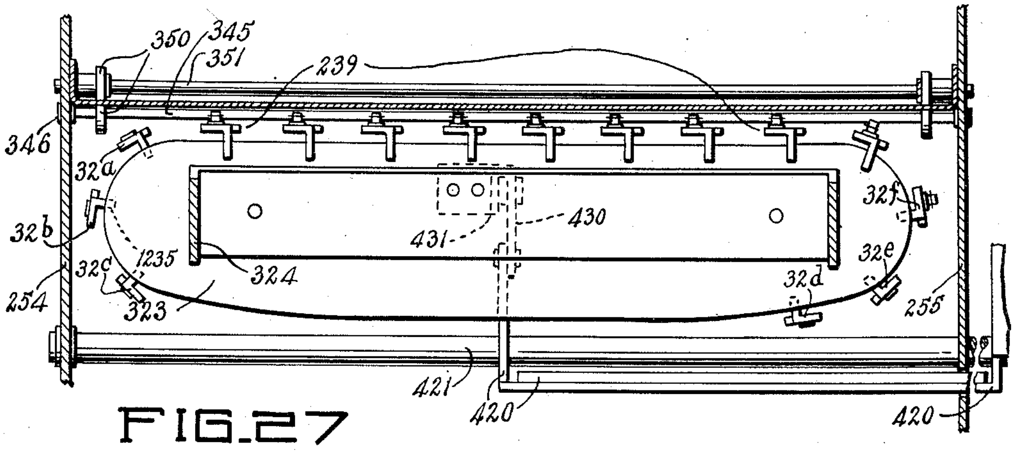

Fig. 27 is a view similar to Fig. 26 but taken forwardly thereof, substantially along the lines 27—27 of Fig. 2.

Fig. 28 is a plan view of the multiply-divide control mechanism and is taken in the direction of the arrow 28 in Fig. 2 with the cover removed.

Figure 29:
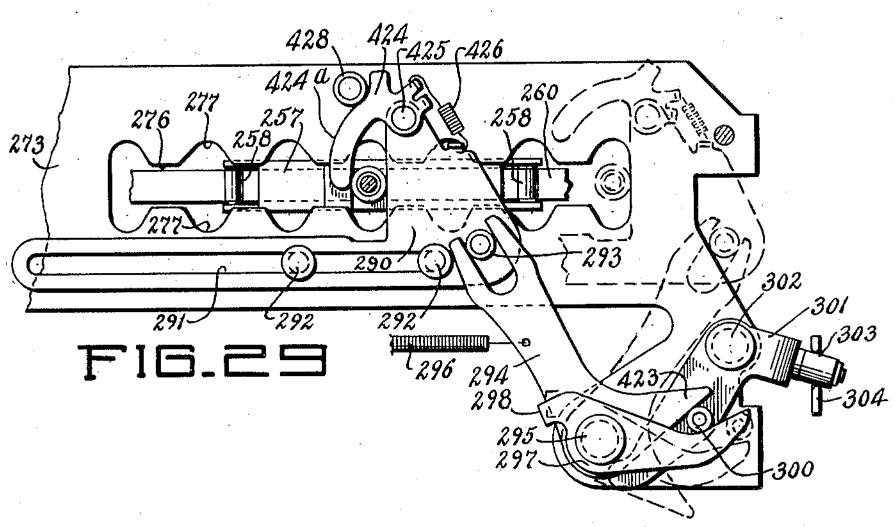

Fig. 29 is a fragmentary view showing part of the mechanism of Fig. 28 but in alternate status.

Fig. 30 is a fragmentary sectional view taken along the line 30—30 of Fig. 21, illustrating the manner of connecting the multiply-divide control mechanism frame to the remaining framework of the machine.

Fig. 31 is a fragmentary view taken along the line 31—31 of Fig. 30.

Fig. 32 is a fragmentary view taken along the line 32—32 of Fig. 30.

Figure 33:
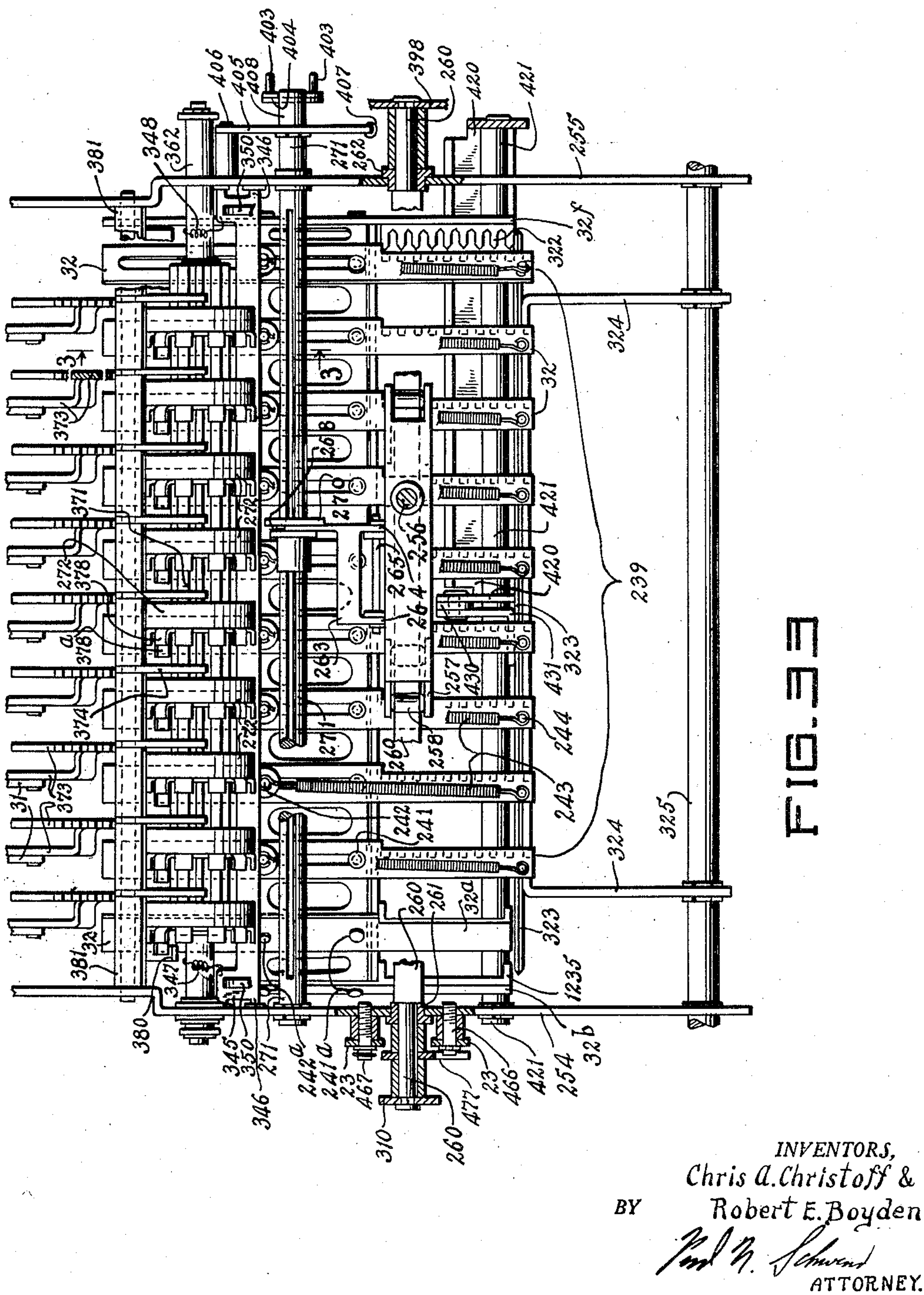

Fig. 33 is a sectional plan view similar to Fig. 28, but is taken substantially along the line 33—33 of Fig. 2.

Figure 35:
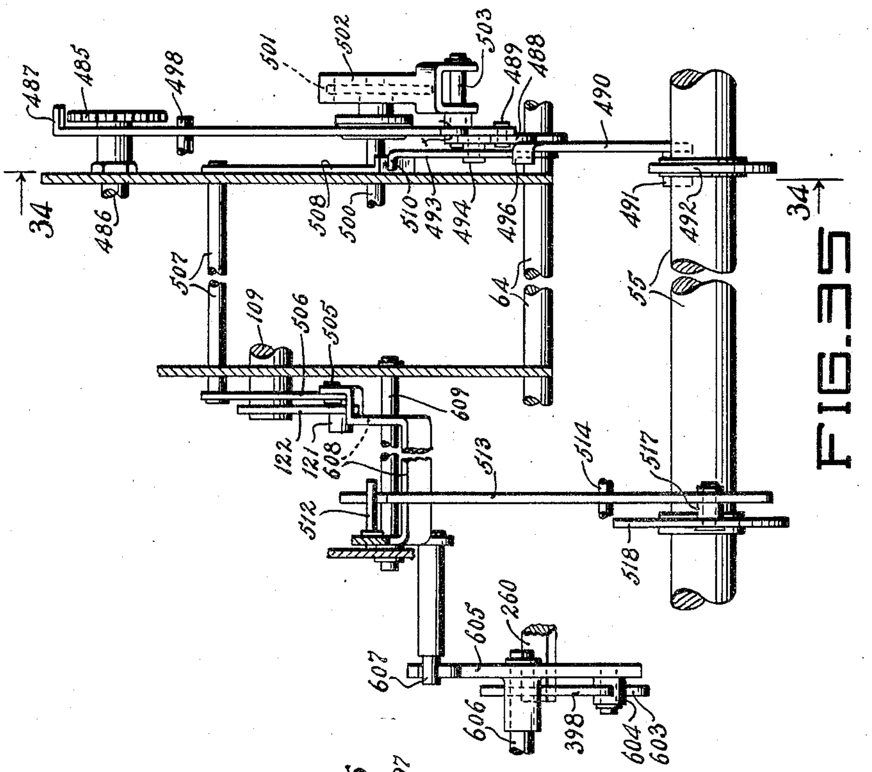
Figure 34:
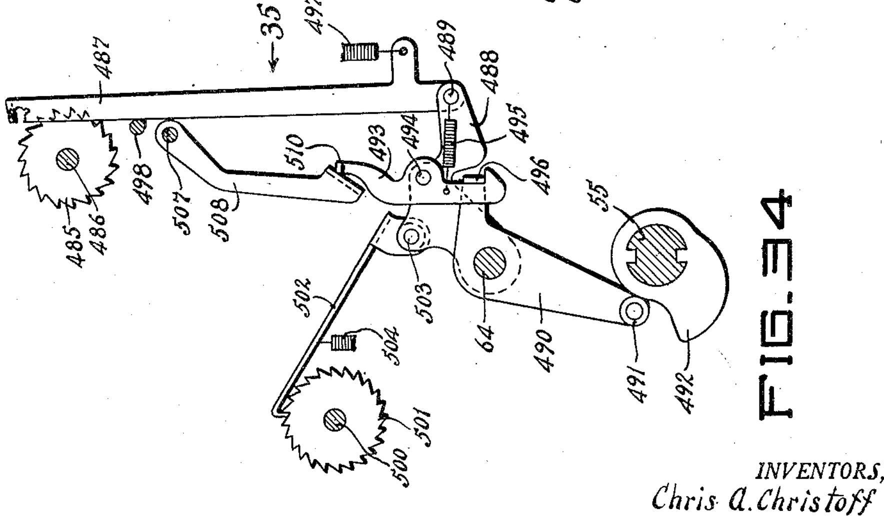

Fig. 34 is a sectional view of the platen and ribbon advancing mechanism taken substantially along the line 34—34 of Fig. 35.

Figures 36, 37, 38:
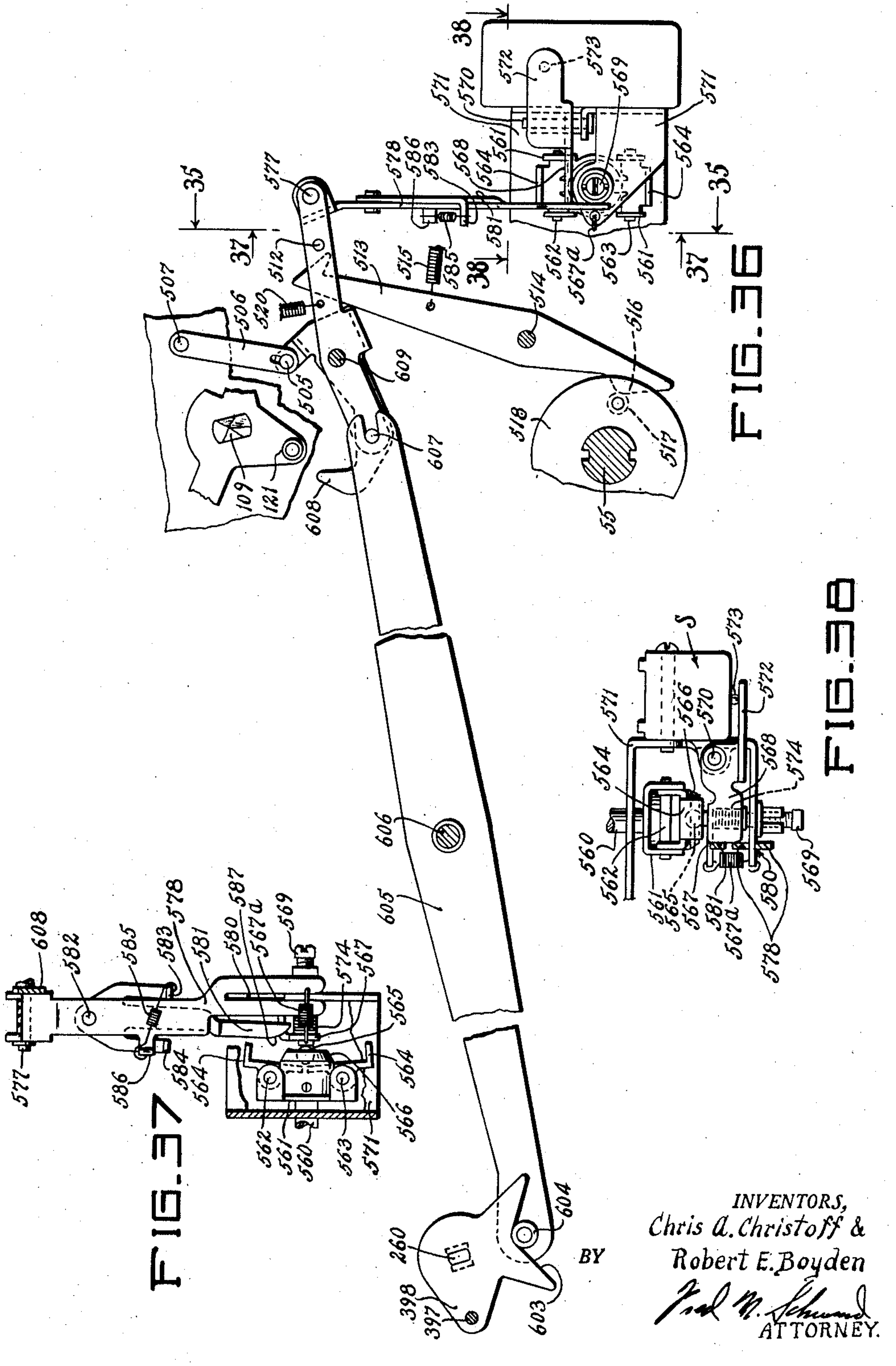

Fig. 35 is a sectional view of the platen and ribbon advancing mechanism and the printer control taken substantially along the line 35—35 of Fig. 36 and in the direction of the arrow 35 in Fig. 34.

Fig. 36 is a side view, taken along the right-hand side of the machine, illustrating a part of the printer suppressing mechanism and the motor governor or speed control mechanism.

Fig. 37 is a sectional view of the motor governor and is taken along the line 37—37 of Fig. 36.

Fig. 38 is a plan view of the motor governor and is taken along the line 38—38 of Fig. 36.

Figure 39:
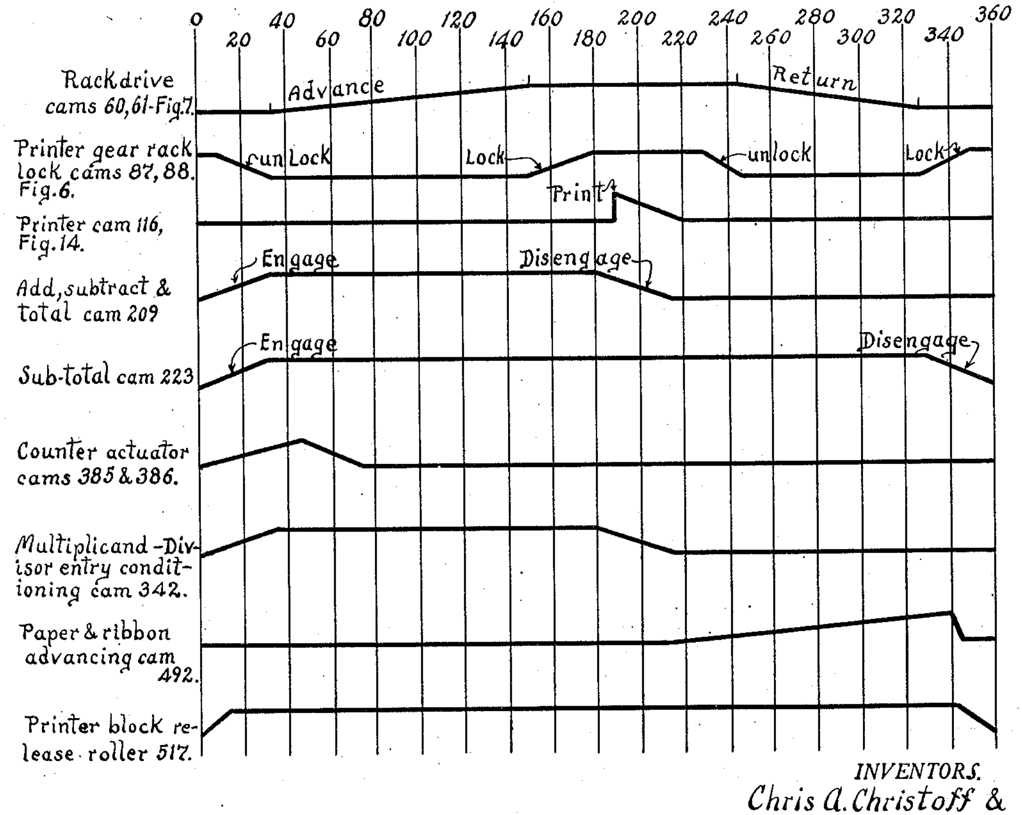

Fig. 39 is a timing chart showing in graphical form the operation of various drive elements of the machine.

*General arrangement*

The particular machine illustrated as embodying the present invention is based partly on the well-known Clary adding machine, portions of which are disclosed and claimed in the following United States patents: No. 2,472,-696 issued on June 7, 1949 to Edward P. Drake; No. 2,490,200 issued on December 6, 1949 to Robert E. Boyden; No. 2,492,263 issued on December 27, 1949 to Robert E. Boyden; No. 2,506,337 issued May 2, 1950 to Robert E. Boyden; and No. 2,583,810 issued on January 29, 1952 to Robert E. Boyden.

The present machine is motor driven under control of various motorized control bars and a multiply-divide control lever. The latter controls are arranged to be operated in various sequences in order to perform various desired calculations or combinations of such calculations, including addition, subtraction, division and multiplication.

A rotary drive shaft operated by the motor is provided to effect various machine functions, the drive shaft carrying various control cams for operating respective units of the machine. The drive shaft is effective under control of a cyclic clutch to rotate one complete revolution for each machine cycle.

Figure 1:
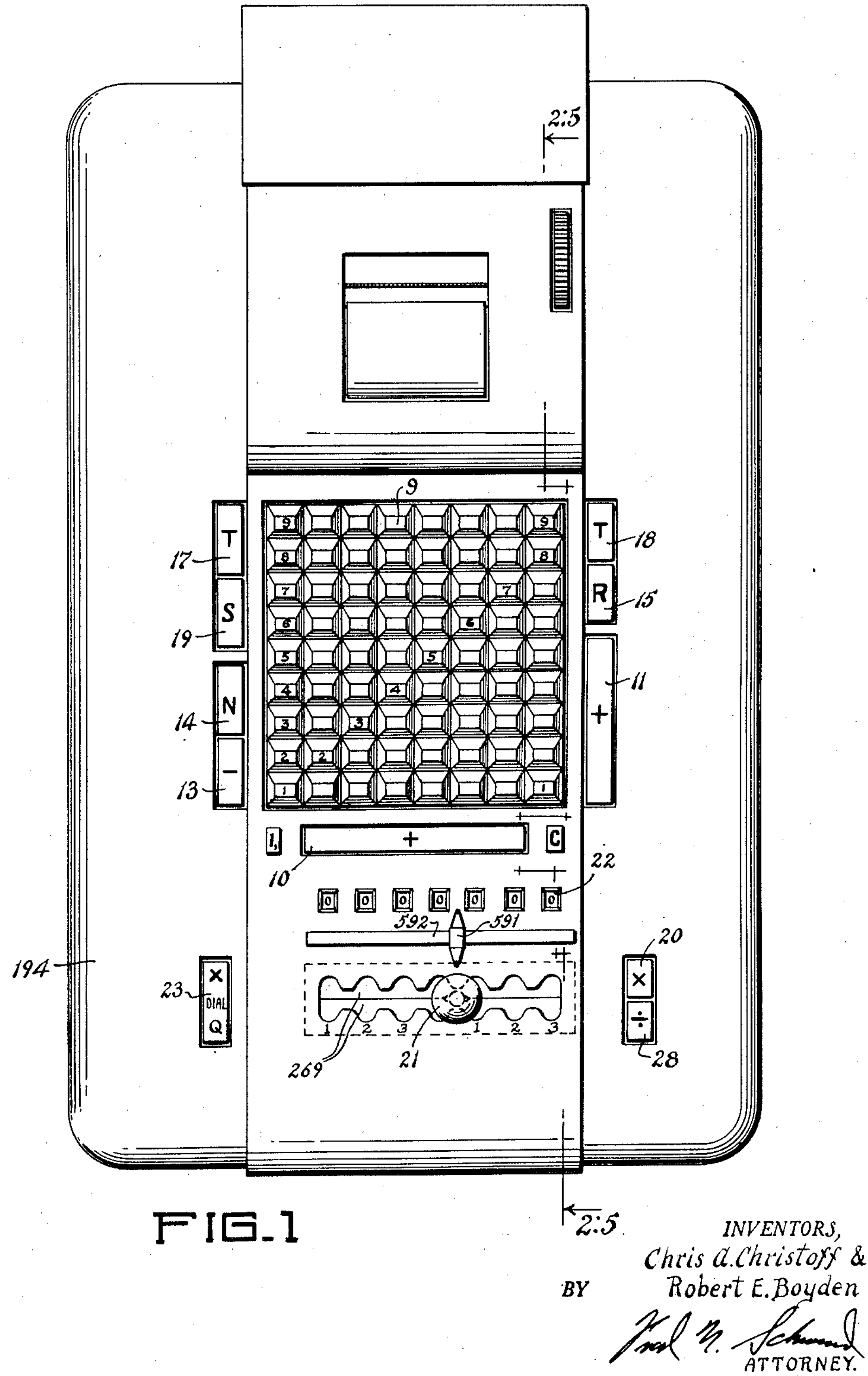

Referring in general to Fig. 1, an amount to be added or subtracted, the dividend and the divisor in the case of a division calculation, and the multiplicand factor in the case of a multiplication calculation, is entered into the machine by depressing appropriate amount keys 9 of the machine keyboard.

In order to add an amount, one or the other of two add bars 10 and 11 is depressed, causing a cycle of operation of the machine to add the amount into an accumulator 8 (Fig. 5) and to print this factor on a paper strip 103. If the amount set up on the keys 9 is to be subtracted from an amount registered on the accumulator, a minus bar 13 is depressed.

If it is desired to print an amount set up on the keys but not to enter the same into the accumulator or other calculating units, a nonadd bar 14 is depressed. In order to add the same amount into the accumulator two or more times, a repeat bar 15 is depressed and held down until the requisite number of cycles, one for each addition, are made by the machine.

When it is desired to obtain the net total amount registered by the accumulator, one or the other of two total bars 17 and 18 is depressed. This will print the total and clear the accumulator to zero. In the event, however, it is desired to obtain a subtotal, a subtotal bar 19 is depressed, causing the amount registered in the accumulator to be printed but retained in the accumulator.

In performing multiplication calculations, the multiplicand is entered into the amount keys 9 and a multiplicand entry key 20 is depressed, transferring the amount from the keys into a multiplicand-divisor storage unit to be described hereinafter. At this time the printing mechanism is actuated to record the multiplicand as at 24 (Fig. 15) on the recording tape 103. The multiplier is entered into the machine by manipulation of a multiply-divide handle 21. The latter is slidable laterally of the machine into different denominational relationships relative to the amount keys and accumulator and is also rockable fore or aft of the machine to respectively effect add or subtract cycling. Thus, to obtain the product of a multiplicand factor by a multiplier factor of, for example, 23, the handle 21 would first be shifted to its tens denominational position and then rocked rearwardly and held there until the machine has additively cycled twice. Thereafter, the handle would be shifted to the right one step to its units denominational position and rocked rearwardly to effect three additive cycles of the machine. During this operation the multiplier factor of 23 would be entered into a multiplier-quotient counter 22 and the product would be accumulated in the machine accumulator. However, the printing mechanism would be disabled.

In order to record the multiplier factor and product as well as clear the machine for subsequent calculations, a multiplier quotient key 23 would be depressed, clearing the counter 22 and printing this amount on the tape at 25, directly below the multiplicand factor 24 (Fig. 15) as indicated. Thereafter, one or the other of the total bars 17 and 18 would be depressed to total out the machine accumulator and record the product, as indicated at 26.

It should be noted that the multiplicand, multiplier and factors, and the product, are all printed in decimally correct relation and with the decimal points all in vertical alignment.

In division calculations, the dividend is first entered into the amount keys 9 and thereafter entered into the machine accumulator by depression of one or the other of the add bars 10 and 11. Obviously, such factor is printed on the tape 103, as for example, indicated at 27 (Fig. 15). The divisor is now entered into the keyboard in its proper decimal relationship relative to the dividend and a divisor entry key 28 is depressed, which effects transfer of the divisor into the multiplicand-divisor storage device and printing of the divisor at **27*a*. Now, the handle 21 is moved laterally and normally to the left of its initial illustrated position until the divisor factor carried by the storage device is properly aligned with the dividend registered on the accumulator. Thereupon, the handle 21 is rocked forward to cause subtractive cycling of the machine. Such cycling will continue (providing the handle is held forward) until the remainder for that denomination reaches a value lower than that of the divisor, at which time the machine automatically stops, indicating an overdrafted condition. The handle is thereafter rocked rearwardly to effect a single additive corrective cycle and is then shifted one denominational position to the right, and the foregoing procedure repeated. The net number of cycles performed in each denominational position of the handle 21 is registered on the storage device 22** in proper decimal relationship, thus indicating the result or quotient.

In order to record the quotient and clear the machine for subsequent calculation, the multiply-quotient key 23 is depressed, clearing the storage device 22 and printing the amount, i. e., quotient, on the tape as indicated at 30 (Fig. 15). The remainder now remaining in the machine accumulator is printed as at 29 and the accumulator cleared by depression of one or the other of the total bars 17 and 18.

*Keyboard*

The keyboard, including the amount keys 9 (Figs. 1, 2 and 5) is of the flexible type, and each amount key when depressed serves as a stop to limit movement of an aligned drive rack 31 which is effective, depending upon the type of calculation, to drive an associated element of the accumulator 8 to enter an amount therein corresponding to the differential movement of the rack, to set the printing mechanism to print such amount, and to set an aligned one of a series of multiplicand-divisor stop slides 32.

The keyboard is divided into a plurality of rows of amount keys ranging in value from 1 to 9 and each key comprises a numbered key top 33 integral with a key stem 34. The latter key stems are guided for vertical movement in aligned slots formed in a top plate 35 and a bottom plate 36, the latter plates being suitably secured together, and to machine frame plates.

The keys in each row are yieldably pressed upward by a tension spring 37 extending the length of the keyboard and suitably attached at opposite ends to the key plate 35. Each spring 37 rests on cross ribs 39 formed across slots 40 in the key plate and also extends through openings in the various key stems. Upon depression of a key, the adjacent portions of the associated spring 37 are stretched and extend through the slot 40.

Figure 5:
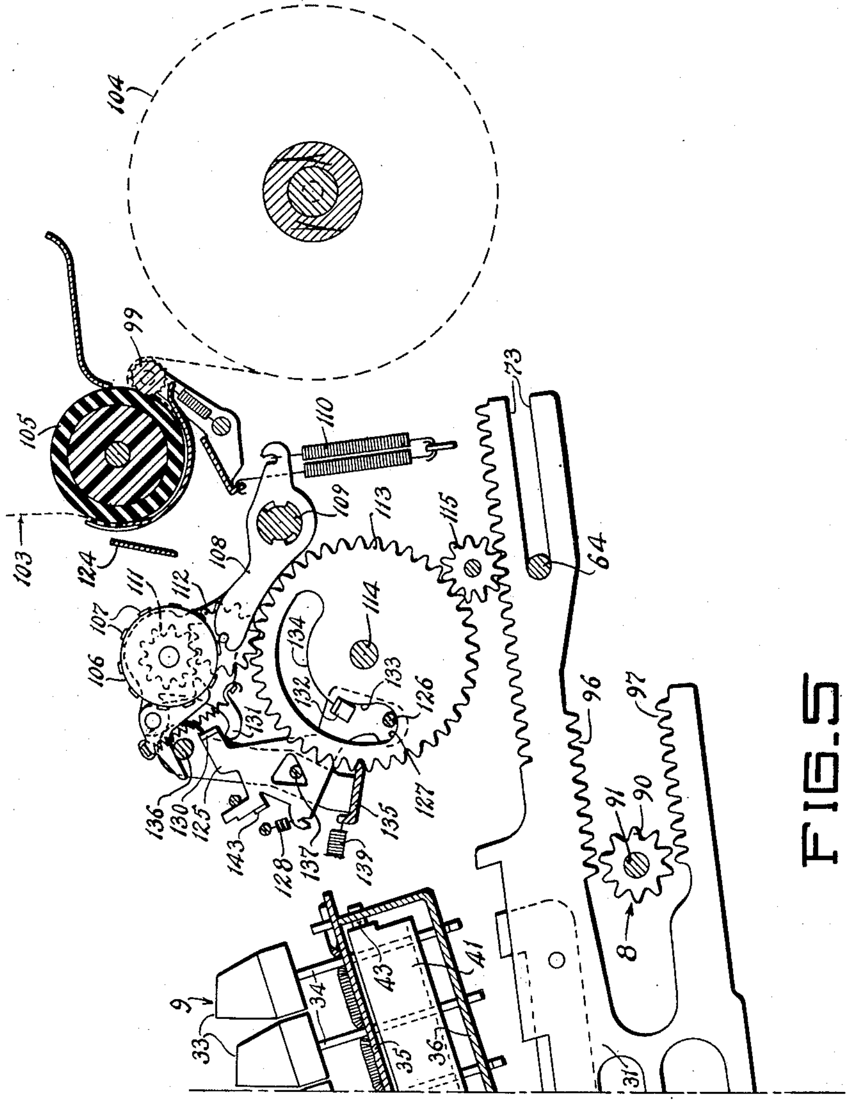
Fig. 5 is a partial longitudinal sectional view through the machine and is taken along the rear portion of the line 2:5—2:5 of Fig. 1.

Each key, when depressed, is latched in blocking position by a locking bail 41 pivoted at opposite ends thereof on the vertical walls of the key plate 36 by trunnion bearings 42 and 43 (Figs. 2 and 5). For this purpose, each key stem has a cam lobe (not shown) formed thereon which, when the key is depressed, rocks a locking bail 41 laterally against the action of a spring 44 extending between the top of each bail and the bottom of its adjacent bail. As the key reaches the bottom of its stroke the spring 44 returns the bail to a position over the top of the cam lobe, thereby latching the same.

The key stems 34 cooperate with respective ones of a series of shoulders 46 formed on the aligned racks 31 to control differential positioning of the latter. The various shoulders 46 are spaced apart distances slightly greater than the distances between the stems 34 so that depression of any key will permit forward movement of the associated rack 31 a number of increments equal to the value of such depressed key.

A zero block 47 extends downwardly from each of the lock bails 41, and when no key in the associated order is depressed, the bail 41 of that row will be spring held in an extreme inwardly rocked position wherein the zero block 47 lies directly in front of one of the shoulders 46 of the aligned rack, thereby preventing a substantial forward movement of this rack during subsequent operation of the machine. However, upon depression of a key, the locking bail will be held outward thereby sufficiently to retain the zero block 47 out of cooperative relation with its associated rack.

Referring in particular to Fig. 9, the stems of the various control bars such as 13, 14, 17 and 19, and excepting keys 20, 23 and 28, are also slidably mounted in aligned slots formed in the key frame plates 35 and 36.

*Drive*

The various units of the machine are driven by a rotatable drive shaft 55 (Figs. 6, 7, 9, 14, 16, 17, 19, 21, 34, 35 and 36) from an electric motor (not shown) under control of a cyclically operable clutch generally indicated at 56 (Figs. 9 and 16). The driven side of the clutch is attached to the shaft 55 and the clutch is controlled by a clutch dog 57 pivoted on a frame pin 58 and arranged to effect engagement of the clutch upon counterclockwise movement thereof away from the clutch. Disengagement of the clutch is effected by rocking the dog 57 clockwise into the position illustrated in Fig. 9.

Figures 6, 7, 8:
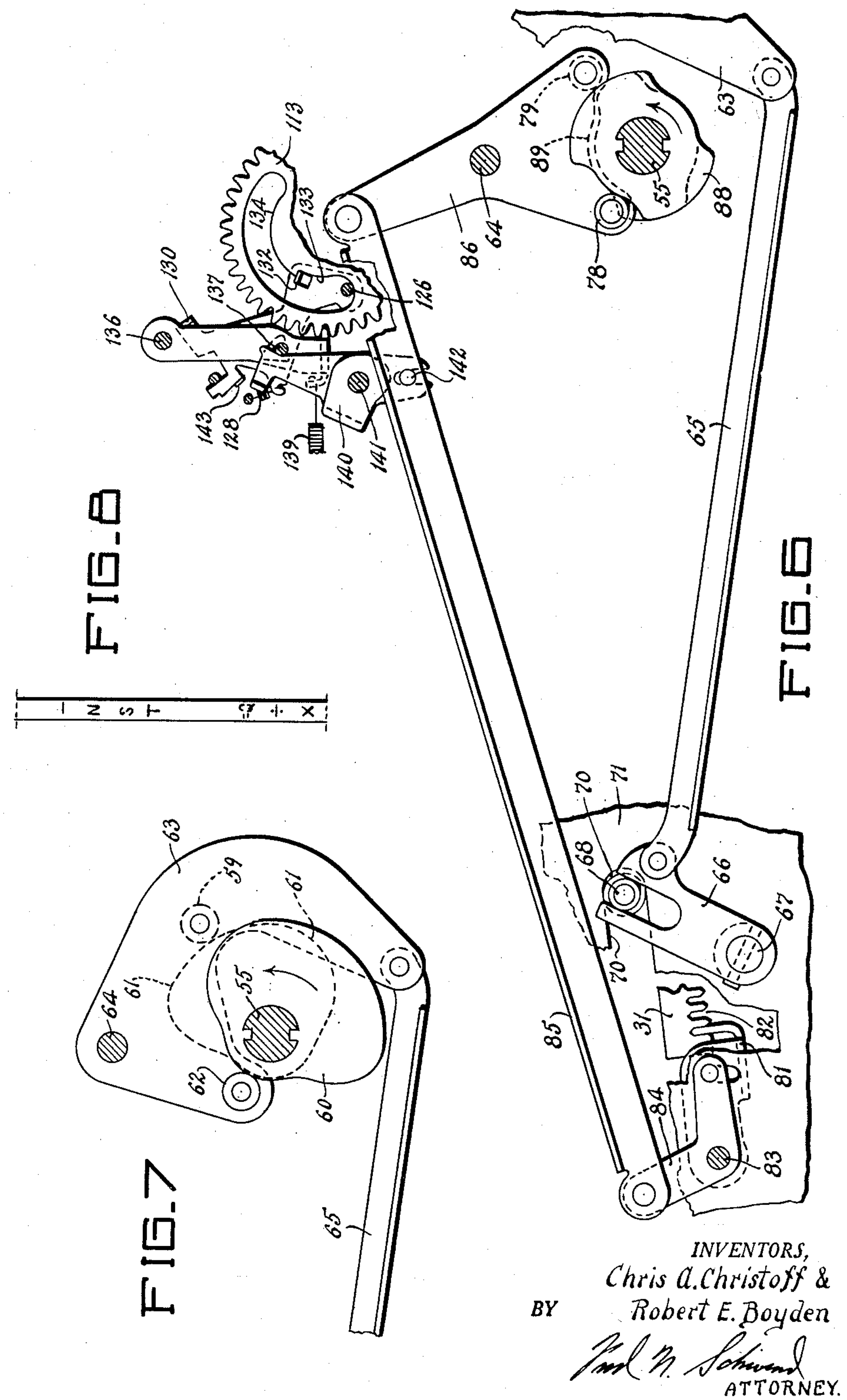
Fig. 6 is a side view illustrating the rack and printer lock controls and part of the rack drive instrumentalities.
Fig. 7 is a side view illustrating the rack drive cams and cam follower.
Fig. 8 is a developed view of the symbol printing dial.

Means are provided for yieldably transmitting a reciprocating motion to the various drive racks 31 from the shaft 55 during rotation of the latter. Referring to Fig. 7, a pair of juxtaposed complementary drive cams 60 and 61 are keyed on the shaft and cooperate with respective ones of a pair of rollers 62 and 59 mounted on a cam follower 63. The latter is pivoted on a stationary shaft 64 and is connected by a link 65 (see also Fig. 6) to an arm 66 suitably fastened on a rock shaft 67. A similar arm 66a is also fastened on the shaft 67 on the opposite side in the machine and both arms are bifurcated to embrace a rack drive shaft 68 mounted for fore and aft movement in elongated slots, one of which is shown at 70 formed in frame plate 71.

Referring to Fig. 2, each of the various drive racks 31 is supported at its forward end by the drive shaft 68, the latter being slidably embraced by a slot 72 in the rack. The rear end of each of the racks is provided with an elongated slot 73 (Fig. 5) which embraces the stationary shaft 64.

The slot 72 in each of the racks terminates at its closed end in opposed notches 74 normally engaged by rollers 75 carried by drive elements 76. The latter are rockably fitted in circumferential grooves formed in the shaft 68 and the adjacent drive elements 76 associated with each rack are spring urged in opposite directions by a tension spring 77 extending between the tails of the two elements to resiliently hold the rollers in the notches, thus forming a yieldable connection between the shaft 68 and the respective drive racks 31.

When, during forward movement of the shaft 68, as occurs during the first half of a machine cycle, each of the drive racks 31 is arrested due to striking against a depressed key stem or the associated zero block 47 or engagement of a "nines" stop shoulder 80 against a locking bail 81, the rollers 75 will ride out of the associated notches 74, thereby breaking the connection between the shaft 68 and the rack 31. The rollers will thereafter merely ride along the edges of the slot 72.

The racks 31 are returned to their zero or home positions during the latter half of each machine cycle by the cams 60 and 61, and means are provided for locking all of the various racks 31 in their zero positions at the completion of the machine cycle, as well as in their forwardly advanced positions during the midpoint or printing phase of a machine cycle. For this purpose, a series of notches 82 (Figs. 2 and 6) are formed on the under forward edge of each of the racks 31 and are spaced apart distances equal to the different increments of movement of the racks. The various notches are adapted to be engaged by the locking bail 81 after both the forward and return movements of the racks. For this purpose, the bail 81 is pivoted at opposite ends on frame pins 83 and is provided at its right hand end with an arm 84 (Fig. 6) connected by a link 85 to a cam follower 86. The latter is pivoted on the stationary shaft 64 and is provided with rollers 78 and 79 which cooperate with respective ones of a pair of complementary drive cams 88 and 89 keyed in juxtaposition with each other on the drive shaft 55.

*Accumulator*

The details of the accumulator unit are not pertinent to the present invention and thus they are omitted herein. However, reference may be had to said Drake Patent No. 2,472,696 for the details of an accumulator applicable to the machine.

The accumulator unit comprises a series of denominationally arranged ten tooth accumulator gears 90 (Figs. 5 and 16) independently and rotatably mounted on an accumulator shaft 91.

The shaft 91 and a second shaft 92, also forming part of the accumulator, are guided at opposite ends thereof in vertical slots 93 and 94, respectively (Fig. 17), formed in plates, one of which is shown at 95, suitably secured, in a manner not shown, to the machine frame plates.

Means are provided for raising and lowering the accumulator unit for the purpose of engaging the various accumulator gears 90 with either upper rack gear sections 96 or lower rack gear sections 97 formed on the drive racks 31. That is, during an additive operation, the accumulator is raised to mesh the accumulator gears 90 with the upper rack sections 96 so that during forward movement of the racks the gears will be rotated in a counterclockwise direction, while during a subtractive operation the accumulator is lowered to mesh the gears 90 with the lower rack gear sections 97 to effect a clockwise rotation of the gears during forward movement of the racks.

For the purpose of raising and lowering the accumulator unit in accordance with the type of operation to be performed, a box cam, one of which is shown at 98 (Fig. 17), is provided at each side of the machine and is pivoted on a frame stud 100. Each cam is provided with a cam slot 101 which embraces a roller 102 mounted on the respective end of the accumulator shaft 91. Clockwise rocking movement of the cam 98 from its illustrated neutral position will raise the accumulator into its additive position, whereas counterclockwise rocking of the cam will lower the accumulator to its subtractive position, as will become more fully apparent hereinafter.

*Printer*

The various values registered on the racks 31 during either item entry or totalling operations are printed on the paper tape 103 (Figs. 5 and 15) which is fed from a supply roll 104, over a pressure roll 99 and around a rotatable platen 105 to a printing station where the values are printed thereon.

The printer comprises a series of numeral printing wheels 106, one entrained with each drive rack 31. Each dial has a series of type 107 thereon ranging in value from zero to 9 and these dials are so connected to their associated racks that they will print a digit corresponding to the value of a key depressed in the associated order and to the numerical position to which the rack is moved in its forward stroke in either item entry or totaling operations.

Each printing wheel 106 is rotatably mounted on an individual lever 108 which is loosely keyed on a printer control shaft 109 and is spring urged clockwise toward the platen 105 by an individual tension spring 110. A gear 111 fixed to each printing dial meshes with an associated gear 112 also rotatably mounted on each lever 108. Except during printing operations, the levers 108 are held by shaft 109 in their positions illustrated in Fig. 5, wherein the gears 112 mesh with idler gears 113 independently and rotatably mounted on a fixed shaft 114. The latter idlers are continuously entrained with respective ones of the drive racks 31 through pinion assemblies, one of which is shown at 115.

The printer control shaft 109 is controlled by a printer cam 116 (Fig. 14) keyed on the aforementioned drive shaft 55. The cam 116 engages a roller 117 mounted on a cam follower 118 which is fulcrumed on the stationary shaft 64 and is provided with a camming surface 120 engaged by roller 121 on an arm 122 fixed to the shaft 109. A tension spring 123, along with the various springs 110, holds the cam follower 118 in engagement with the cam 116. However, during the printing phase which occurs at approximately mid cycle, and after the racks have adjusted the printing wheels 106, the cam 116 allows the shaft 109 to rock clockwise, thereby allowing all levers 108 which are otherwise allowed to do so, to force the printing wheels 106 into contact with a printing ribbon 124 and into contact with the paper tape 103 as it passes over the platen 105.

Means are provided to prevent printing of zeros to the left of the highermost significant digit in a value being printed. For this purpose a latch 125 is provided adjacent each printing lever 108 and is journalled on a stationary rod 126 extending through arcuate slots 127 formed in the various gears 113. The latches 125 are urged clockwise by tension springs 128 and are provided with ears 130 adapted to overlie tails 131 extending from the various printing levers 108.

Ears 132 are also formed on the latches 125 and are adapted, when the associated rack 31 and entrained gears are in their zero positions illustrated in Fig. 5, to engage an arcuate section 133 on the associated idler gear 113. The radius of the section 133 is such as to allow the latch to position its ear 130 in blocking relation to the tail 131 of the aligned lever 108, preventing the latter from being rocked into printing contact with the paper during a printing operation. However, when any idler gear 113 is rotated to its "1" or any other digit position, the ear 132 will rest on a raised arcuate portion 134 of the slot 133 in its associated idler gear, thereby blocking the respective latch 125 from moving inward into blocking relation with its printing lever 108.

Means are provided for rocking the various latches 125 counterclockwise of their positions illustrated in Fig. 5 at the beginning of a cycle and preparatory to forward movement of the racks 31 so that the arcuate portions 134 can pass under the ears 132 of latches 125. For this purpose, a bail 135 extends across the various latches and is suspended from a stationary cross rod 136. The bail is provided with a cross rod 137 extending through triangular openings in the various latches 125.

The bail 135 also forms an aligner for the various idler gears 113 and for this purpose normally engages between two teeth of the latter as shown in Fig. 5. The bail is normally urged clockwise, away from engagement with the gears 113, by a tension spring 139, but is controlled by the aforementioned cams 88 and 89 (Fig. 6) through an arm 140 pivotally supported on a frame pin 141 and coupled through a pin and slot arrangement 142 to the aforementioned link 85. The upper end of the arm 140 engages one end of the cross rod 137 to normally hold the bail 135 in an inwardly rocked position, as shown, against the action of spring 139, where it engages the idlers 113. However, during a cycle and when the racks are both advanced and retracted, the arm 140 is rocked counterclockwise, permitting spring 139 to withdraw the bail 135, thereby picking up the various latches 125 to remove their ears 132 from engagement with the inner edges of slots 133 so that the gears 113 will be free to turn.

In order to permit printing of zeros to the right of the highermost significant digit being printed, each of the latch levers 125 is provided with an ear 143 overlapping the corresponding ear of the next latch lever to the left, i. e., the latch lever in the next higher denominational order. Therefore, when any latch lever is held outwardly by engagement with the surface 134 of its associated gear 113, all similar latch levers to the right thereof will likewise be held outwardly, permitting printing of zeros as well as significant digits in such lower orders.

The platen 105 is normally advanced one increment during each machine cycle. For this purpose, a ratchet 485 (Figs. 34 and 35) is suitably secured to the shaft 486 of the platen, and is arranged to be advanced by a pawl 487 pivoted on a pin 489 at the lower end thereof to an operating lever 488.

The lever 488 is pivoted on the aforementioned shaft 64 in juxtaposition with a cam follower 490 having a roller 491 thereon contacting a combined paper and ribbon feeding cam 492, the latter being keyed on the main drive shaft 55. Normally, the lever 488 and cam follower 490 are operated as a unit by the cam 492. For this purpose a coupling member 493 is pivoted at 494 on lever 488 and is held by a spring 495 in a position to hook under an ear 496 of the cam follower 490.

A spring 497 tensioned between a lower part of the pawl 487 and a suitable part of the machine frame (not shown) normally maintains the pawl 487 in its upper position illustrated in Figs. 34 and 35 and also holds the pawl in a counterclockwise rocked position wherein it rides against a guide pin 498 and wherein it will be in position to engage and advance the ratchet wheel 485. Means (not shown) are provided for shifting the pin 498 during totalling operations to permit the pawl 487 to engage and advance the ratchet wheel 485 an abnormal number of increments.

Although the mechanism for advancing the ribbon 124 (Fig. 5) along the length of the platen is not disclosed herein, such mechanism is operatively connected to a shaft 500 to which is attached a ratchet 501. The latter cooperates with a drive pawl 502 pivotally mounted at 503 on the lever 488 and urged downwardly into engagement with the ratchet 501 by a spring 504. Thus, during each cycle of the machine, the cam 492 will be effective to normally operate pawls 487 and 502 to advance their respective ratchet wheels 485 and 501.

*Clutch controls*

Operation of the machine and engagement of the clutch 56 (Figs. 9 and 16) is effected by depressing any of the various machine control bars and keys as well as by rocking of the multiply-divide handle 21 fore or aft of the machine. Normally, the machine will continue to cycle as long as the control bar, key or handle is held in actuated position. However, upon an overdraft of the accumulator in one direction or another, the clutch will be automatically disengaged, even though the clutch control bar or handle be held in actuated position.

Referring in particular to Fig. 9, the aforementioned clutch control dog 57 is normally urged clockwise toward its illustrated clutch disengaging position by a tension spring 145. The clutch dog is normally coupled to a clutch control bar 146 by a hook member 147 pivoted to the control bar at 148. The hook member has a notch normally held in embracement with a pin 150 on the clutch dog by a tension spring 151 extending between the hook and a frame pin 152.

The clutch control bar 146 is supported for longitudinal movement by a pair of frame pins 153 and 154 embraced by elongated slots 155 in the bar.

The control bar 146 has four inclined cam slots 156 formed therein, each of which underlies a pin 157 carried on a lever 158, pivoted on a frame pin 159, and urged upwardly by a spring 160 extending from a suitable frame pin (not shown) and the pin 157. The pins 157 underlie the minus, nonadd, subtotal and total keys 13, 14, 19 and 17, respectively. Therefore, depression of any of these bars will likewise depress its associated pin 157 to cam the control bar 146 forwardly against the action of spring 151, and thus, through the hook 147, rock the clutch control dog 57 counterclockwise to cause engagement of the clutch 56.

Provision is also made to effect engagement of the clutch upon depression of the add bar 10. As shown in Fig. 2, the add bar 10 is connected by a pin and slot connection 38 to a bail 45 which extends across the machine and is pivoted at 48 on stationary frame pins. The bail carries a roller 161 (Fig. 9) the latter coacting with a camming surface 162 formed on the forward end of the clutch control bar 146 so as to cam the latter bar forwardly upon depression of the add bar.

The clutch control bar is also actuated by depression of the control bars 20, 23 and 28, associated with the multiply-divide mechanism, and by actuation of the multiply-divide handle 21, as will appear hereinafter.

Actuation of the clutch dog will also effect closing of a normally open motor switch, generally indicated at 163, connected in the power circuit for the machine motor. A switch control lever 164 is pivoted on a frame pin 165 and overlies an ear 166 on the clutch dog 57. As the latter dog is rocked counterclockwise to effect engagement of the clutch 56, its ear 166 will rock the lever 164 against the action of its tension spring 167 to permit a switch plunger 168 to move downwardly, and thereby, in a manner not shown, close the motor circuit.

For the purpose of automatically causing disengagement of the clutch 56 upon an overdraft of the accumulator in either direction, the accumulator gear 90*a* (Fig. 16) located in the highest denominational order of the machine, is provided with a laterally extending ear 170 which cooperates with a pair of by-pass pawls 171 and 172. The latter are pivotally supported at 173 and 174, respectively, on a plate 175 which is freely pivoted on the lower accumulator shaft 92. A tension spring 176 extends between the tails of pawls 171 and 172 to normally hold the same in contact with a hub 177 of the plate 175.

The plate 175 is yieldably held in either of two rocked positions by a detent 178 pivoted at 180 on an associated accumulator brace plate 181. A pin 182 on the lower end of the detent is held in engagement with one or the other of two detenting notches in the plate 175 by a tension spring 183 extending between the shaft 92 and pin 182.

The plate 175 is connected by a link 184 to the lower end of a lever 185. The latter is fulcrumed on the aforementioned pin 58 and is provided with a camming stud 186 which coacts with a camming surface 187 formed on the coupling hook 147. An additional arm of lever 185 is connected through a pin and slot coupling 188 to an indicator lever 190 pivoted on a frame pin 191. The upper end of a lever 190 is provided with a flag extension 192 movable into and out of position in line with a window 193 mounted in the machine cover 194.

The accumulator plate 175, and indicator lever 190 are illustrated in the normal positive condition of the accumulator with the gear 90*a* registering zero. It will be recalled that in additive operations the accumulator gears are rotated counterclockwise, whereas in subtractive operations the gears are rotated clockwise. Thus, as amounts are added into the accumulator and the capacity of the latter is exceeded, resulting in counterclockwise rotation of the highermost denominational accumulator gear 90*a*, the ear 170 carried thereby will merely wipe over the top edge of the pawl 171, rocking this pawl clockwise against the action of its spring 176 without affecting the position of the plate 175 and entrained linkage. However, in the event that amounts subtracted from the accumulator exceed positive amounts registered therein, the accumulator gear 90*a* will be rotated clockwise beyond its position shown in Fig. 16, causing the ear 170 to strike the rear edge of pawl 171, rocking the plate 175 counterclockwise about shaft 92 to its alternate position. In doing so, the link 184 will be drawn forward, rocking the lever 185 and causing its stud 186 to cam the hook 147 upward, thus releasing the clutch dog 57 so that it may return under the action of its spring 145 to clutch disengaging condition, even though the clutch control bar or handle is held in actuating position. Simultaneously, the indicator lever 190 will be rocked to position its flag extension 192 in overdraft indicating position, as shown by the dot-dash lines 195. The lever 185 will now have been positioned to locate its pin 186 beyond the camming surface 187 and in the dot-dash position 186*a*. Thus, the hook member may be again spring moved into coupled relation with the clutch dog 57 as soon as the control bar or handle is returned from actuating position so as to permit return of the clutch bar to initial position.

In the event that the accumulator is overdrafted from its above described negative condition to its normal positive condition, the accumulator gear 90*a* is rotated counterclockwise, causing the car 170 to strike the forward end of by-pass pawl 172. This will rock the plate 175 back to its position shown in Fig. 16 so as to return the pin 186 from its dotted line position 186*a* to its full line position. Therefore, the pin 186 will again cam the hook member 147 upward to release the clutch dog 57 to effect clutch disengagement.

Means are provided for returning the plate 175, indicator lever 190, etc., to their normal illustrated positions as an incident to a total taking operation, and in the event the accumulator has previously been set in a negative overdrafted condition. For this purpose, the pin 157 (Fig. 16) associated with the total key 17 is embraced by a bifurcated extension 196 of a bail 197 pivoted on frame pins, one of which is shown at 198, and having a portion thereof located directly in front of an ear 200 extending from the indicator lever 190. Thus, depression of the total bar will rock the bail 197 counterclockwise and directly return the lever 190 from its overdraft indicating position 190*a*, and therewith return the remaining entrained linkage, including plate 175, to its position shown in Fig. 16.

*Accumulator controls*

As mentioned heretofore, the accumulator is raised or lowered from its neutral position shown in Fig. 5 into mesh with upper or lower rack sections 96 and 97 of the various drive racks 31, depending on whether additive or subtractive and totalling operations are to be made. For this purpose, mechanism is provided under control of the multiply-divide handle 21 and the various control bars, with the exception of the keys 20, 23 and 28, to position the accumulator. The box cams, one of which is shown at 98 (Fig. 17) each carries two pins 203 and 204 located on opposite sides of the pivot pin 100. These pins are adapted to be selectively engaged by a hook member 205 pivotally connected at its rear end at 202 to a three-arm cam follower 206 pivoted on the shaft 64. The cam follower is urged counterclockwise by a tension spring 207 to press a roller 208 on a depending arm thereof against a cam 209 keyed on the drive shaft 55.

The cam 209 has a high portion extending over substantially half of its periphery whereby to rock the cam follower 206 and thereby normally position the hook member rearwardly during approximately the first half of a machine cycle.

Normally, when the machine is at rest, and during additive operations, such as addition and multiplication, the hook member 205 is raised by a tension spring 205*a* into its position shown, wherein a slot in the upper edge thereof engages the pin 203 so that as the hook member is moved rearwardly, it will rock the box cam 98 clockwise, to raise the accumulator into its additive position. Such action will occur prior to forward movement of the racks.

Means are provided under control of certain of the control bars and the multiply-divide handle 21 (when rocked forwardly) for locating the hook member 205 in lowermost position to effect subtractive entries into the accumulator. For this purpose, a control bar 50 is provided, being supported for longitudinal movement by a pair of parallel links 210 suspended from frame pins 211. The bar 50 is provided with four inclined camming surfaces 212 underlying the aforementioned depressible pins 157 associated with the control bars 13, 14, 17 and 19 (Figs. 1 and 9).

The bar 50 has a pin and slot connection 213 with a bell crank 214 which is fulcrumed on a frame pin 215 and is provided with roller 216 embraced by an elongated slot formed in the hook member 205. The camming surfaces 212 on bar 50 are so arranged that upon depression of the minus bar 13, total bar 17, or the subtotal bar 19, the control bar will be moved forwardly to its fullest extent which will be effective through the bell crank 214 to lower the hook member 205 into embracing engagement with the pin 204 so that subsequent rearward movement of the hook member will rock the box cam 98 counterclockwise and thereby lower the accumulator into its subtractive position relative to the racks.

The contour of the camming surface 212 underlying pin 157 associated with the non-add bar 14 is such that depression of this bar will move the control bar 50 only half-way through its forward stroke so that the hook member 205 will be located in an intermediate position wherein it will not engage either of the pins 203 and 204. Consequently, the hook member will be ineffective to rock the cam 98 from its neutral illustrated position during operation of the machine.

During adding or subtracting operations, and after the high portion of the cam 209 has passed the roller 208, the spring 207 will become effective to return the hook 205 and consequently the cam 98 and the accumulator to their neutral positions before return of the racks from their forwardly advanced positions.

In order to maintain the box cam 98 in its illustrated neutral position when so located, a centralizer lever 217 is provided, being pivoted on a frame pin 218 and urged clockwise by tension spring 220 to maintain a roller thereon in engagement with a notch 221 formed on the lower edge of the cam.

In totalling operations, the accumulator is returned to zero during the first part of a machine cycle and is then placed in neutral position in the same manner as in normal adding and subtracting operations. However, in subtotalling operations, the accumulator is returned to zero during the first part of a cycle and is then reset at its former accumulator value during the latter part of the cycle, i. e., during return of the racks. Therefore, it is necessary in the latter operation to maintain the accumulator in mesh with the racks during both forward and return strokes of the latter. To this end, a second cam 223 having a high portion extending around the greater part of its periphery is keyed on the shaft 55 directly adjacent the cam 209. Cam 223 engages a roller 224 mounted on a cam follower 225, also pivoted on the shaft 64.

A slot 226 is formed in cam follower 225, which slot is coextensive with a slot 227 in the cam follower 206. However, it will be noted that the portion of the follower 225 containing slot 226 extends rearwardly beyond the portion of cam follower 206 which contains the slot 227. A pin 228 carried by a link 230 rides within one or both of the slots 226 and 227, depending upon its position longitudinally of the machine.

The link 230 is normally held in rearward position by a tension spring 231 so as to locate the pin 228 solely within the slot 226. However, upon depression of the subtotal bar, the lever 158 associated therewith will be rocked clockwise, and a pin 232 carried by a depending leg thereof, and extending into an elongated slot 233 in the link 230 will pick up the latter and move the pin 228 forwardly into a location within both slots 226 and 227. In this condition, i. e., during a subtotalling operation, the two cam followers 206 and 225 will move as a unit and will therefore, through the hook member 205 and cam 98, hold the accumulator in mesh with the racks throughout the major portion of the cycle.

Means (not shown) are provided under control of both the total and subtotal keys 17 and 19 to release the amount keys 9 at the start of a totalling or subtotalling operation and to arrest the accumulator gears 90, 90*a*, etc. (Figs. 5 and 16), when the latter are returned by the racks to zero.

*Multiply-divide mechanism*

Referring to Figs. 2, 4, 26, 27 and 33, the multiply-divide mechanism comprises a series of multiplicand-divisor stop slides 32 spaced apart the same distances as the racks 31 and slidably carried on a flexible belt 236. The belt, which is constructed of thin flexible metal, such as beryllium copper, is wrapped around a pair of flanged pulleys 237 and 238 located at opposite sides of the machine, whereby to carry the various slides into different denominational relationships with the racks.

The belt 236 is normally positioned to maintain the stop slides 32 out of alignment with the various racks, i. e., between adjacent racks, but is movable laterally of the machine by the handle 21 into any of various selected positions where the slides are located in the paths of movement of adjacent racks. As will appear hereinafter, the slides may be set longitudinally by certain of the racks so as to register the multiplicand or divisor in multiplication or division calculations, respectively. On the other hand, the slides, having a value registered thereon, are utilized to differentially arrest the racks in corresponding digital positions during multiplication and division calculations. Thus, by proper manipulation of the handle 21 in multiplication problems, the multiplicand is successively entered by repeated additions into different groups of the racks in accordance with the multiplier value. In division the slides, having been set to register the divisor, enter this factor by repeated subtraction successively in the different groups of racks, the same being subtracted from each group until an overdraft occurs, at which time the factor is added back once and then subtracted repeatedly from the next succeeding lower order group of racks, etc.

As shown in Fig. 4, each stop slide 32 has an elongated slot 240 therein embracing two guide pins 241 and 242 fastened to the belt 236. A tension spring 243 is extended between the rearmost pin 242 and a pin 244 fastened to the forward end of the slide, whereby to normally hold the slide in its rearmost illustrated position and to return the same to this position from an advanced position when otherwise allowed to do so. In such rearmost position the rearmost end of each slide 32 will be spaced a slight amount forwardly of the forward end of the associated rack 31, leaving a slight gap as indicated at 245 (Fig. 2), permitting the various slides to be moved laterally by the belt 236 past the various racks 31 without interference.

The belt 236 is carried around the flanged portions 246 of the pulleys 237 and 238, and a tension spring 247 (Fig. 26) is connected between the ends thereof to form an endless belt arrangement.

The pulleys 237 and 238 are each rotatably mounted on axle pins 248 extending between the side flanges 250 and 251 of U-shaped bracket 252. The latter is secured by screws 253 (Fig. 26) to side frame plates 254 and 255 which support the multiply-divide mechanism.

The multiply-divide handle 21 is mounted on a pin 256 suitably secured to a generally U-shaped carrier 257. The latter rotatably supports a set of four rollers 258 located in rolling engagement with a square shaft 260, two of the rollers engaging the upper side of the shaft and the other two engaging the lower side. The rollers permit lateral movement of the handle along the shaft but cause the shaft to rock with the handle in any of the different positions thereof. The latter shaft is provided with bushings 261 and 262 rotatably mounted in bearings formed in the side plates 254 and 255, thereby permitting a rocking movement of the shaft 260 by the handle 21.

Means are provided to couple the belt 236 to the handle 21 whereby to carry the former into different denominational positions relative to the racks 31. For this purpose, a connector member 263 (Figs. 2, 26 and 33) in the form of a yoke is provided, having a pair of spaced ears 264 pivoted on a pin 265 which is carried by similar ears extended outwardly from the carrier 257. A depending finger 266 on the connector 263 extends downwardly into an elongated slot 267 (Fig. 4) formed in the belt 236. The yoke portion of the connector 263 fits into a groove 268 of a four-toothed counter actuator gear 270 which is slidably keyed on a counter actuator shaft 271. Thus, as the handle 21 is moved along the shaft 260 it will, through the connector 263, carry the belt 236 and actuator 270 therewith to align the stop slides 32 in cooperative relation with different ones of the racks 31 and to align the actuator 270 into cooperative relation with different ones of a series of toothed dials 272 comprising the multiplier-quotient counter 22.

A top plate 273 extending over the multiply-divide mechanism is provided with depending ears, one of which is indicated at 274 (Fig. 28) suitably secured, as by screws 275, to the side frame plates 254 and 255. The top plate, besides bracing the frame plates 254 and 255, is provided with an elongated slot 276 through which the pin 256 of handle 21 extends. This slot is provided with a series of opposed notches 277 located in the different denominational orders of the machine. Such notches are engageable by a roller 278 rotatably mounted on the lower end of the handle pin 256 to permit fore or aft rocking of the handle 21 only when the latter is located in a denominational position to align the stop slides 32 with associated ones of the racks 31 and to align the actuator 270 with the teeth of an aligned one of the dials 272.

A slot 279, similar in shape to slot 276, is formed in a machine cover 194 which surrounds the machine and through which the handle 21 protrudes. In order to cover the latter slot to reduce the tendency for dirt, etc., to fall through into the interior of the machine, a pair of relatively thin strips 269 of rubber or the like are attached to the underside of the cover and on opposite sides of the slot 279 so that their adjacent edges normally abut each other. The strips 269, however, are sufficiently flexible to permit unhampered lateral and rocking movement of the handle 21.

Means are provided for normally and yieldably urging the handle 21 toward the right of the machine into its lateral position shown in Figs. 1 and 28. For this purpose, an apertured rectangular plate 280 is slidably mounted on the under surface of the top plate 273 by two guide pieces 281 and 282 (see also Fig. 4) secured to the under side of the top plate. The roller 278 extends through the plate 280 and the latter is urged to the right by a tension spring 283 connected at one end thereof to a flexible cable 284 and attached at its opposite end (not shown) to a suitable portion of the machine frame. The cable 284 is reeved over a pulley 285 pivoted on a pin 286 carried by an outboard frame plate 287 forming part of the machine framework. The cable 284 is attached at 288 to the plate 280.

For the purpose of normally limiting the handle 21 in the position shown in Figs. 1 and 26 against the action of spring 283, and in a location wherein the stop slides 32 are located out of alignment with the racks 31, tabs 289 (Fig. 28) are formed on the right hand ends of the guide pieces 281 and 282, the tabs lying in the path of the plate 280 to arrest the same.

A return slide 290 is provided to return the handle 21 leftwardly, as viewed in Figs. 1, 26 and 28, into its illustrated position in the event it has been manually moved to the right of such position. The latter has an elongated slot 291 slidable along guide pins 292 fixed to the top plate 273. The slide 290 is engageable by the roller 278 of handle 21 and is connected through a pin and slot coupling 293 to a bell crank 294 pivoted on a pin 295 fixed to an extension of the plate 273. A spring 296 of approximately the same strength as spring 283 is tensioned between a part of the plate 273 and bell crank 294, thereby yieldably maintaining the latter, along with slide 290, in the position shown against the roller 278 of handle 21, wherein these parts are limited by a lever 297, also pivoted on the pin 295, and provided with an ear 298 engageable by the bellcrank 294. The opposite arm of lever 297 is normally limited against a roller 300 carried by a bellcrank 301 fulcrumed on a stud 302 which is fixed on the top plate 273. The bellcrank 301 is connected through a pin and slot connection 303 (see also Fig. 21) to an actuating lever 304. The latter is pivoted at 305 and is normally held in its position shown by a tension spring 306 so as to cause the bellcrank 301 to limit the parts 290, 294 and 297 in their positions shown in Fig. 28 by reason of a pin and slot connection 49 hereinafter described. However, the handle 21 may be moved to the right into any of the three right-hand denominational positions (aligned with the three right-hand opposed notches 277) if desired, by forcing the same against the slide 290 to overcome the spring 296.

As will be described hereinafter, means are provided for actuating the lever 304 during multiplicand and divisor entering operations in order to cause the bellcrank 301 to force the slide 290 to the left. This will move the handle 21 to the left until aligned with the next denominational order or set of opposed notches 277 to the left.

Means are provided whereby rocking of the handle 21 fore or aft of its neutral position, illustrated in full lines in Fig. 2, into its alternate positions, shown by the dotted lines 21*a* and 21*b*, will cause engagement of the clutch and appropriate positioning of the accumulator to add or subtract amounts thereinto.

Referring particularly to Figs. 10–13, inclusive, the aforementioned bar 260 rockable by the handle 21 is fastened, at the left-hand side of the machine, to an arm 310 which is connected through a yieldable link 311 to an actuating arm 312 pivoted on a frame pin 313. The link 311 is normally held to the length shown in Fig. 10 but may be extended or contracted beyond this position, and for this purpose, is comprised of two link parts 309 and 314 located side by side and pivotally connected at 309*a* and 314*a* to the arms 310 and 312, respectively. Each link part has a cut-out portion 315 therein, forming a pair of inwardly extending tenons 316. A compression spring 317 is compressed over the tenons 316 of both link parts to thereby hold the link 311 at a normal length.

Rearward (clockwise as viewed in Fig. 2) rocking of the handle 21 to its dotted line position 21*b* to effect additive operations of the machine will likewise rock the arm 310 from its neutral position shown in Fig. 10 to that shown in Fig. 12, thereby transmitting through the link 311 a counterclockwise rocking movement to the arm 312, causing an ear 318 thereon to engage the foot 319 on the aforementioned clutch control bar 146, causing the latter to move forwardly to effect engagement of the clutch.

Since, as mentioned heretofore, the accumulator is normally conditioned for an add operation, the accumulator positioning control bar 50 (Fig. 17) will remain unaffected.

On the other hand, rocking of the handle forwardly (counterclockwise as viewed in Fig. 2) to its dotted line position 21*a* will correspondingly rock the arm 310 from its neutral position to that shown in Fig. 11 which, through the link 311, will force the arm 312 clockwise, causing the upper tip thereof to engage an ear 320 on the lever 158 (see also Fig. 9) associated with the minus bar 13. Depression of the latter lever will, through the accumulator positioning control bar 50 set the hook member 205 (Fig. 17) to lower the accumulator into subtractive relation with the racks just prior to engagement of the clutch.

Means are also provided for locking the handle 21 in a rocked position throughout approximately the first half of any machine cycle initiated or controlled by the handle, and in which the accumulator is being digitized for adding or subtracting. Referring to Fig. 23, the cam member 327*a* has a camming surface 353 which coacts with a roller 354 on a bail 355. The latter is pivoted on a frame stud 356 and is provided with a pair of projections 357 forming a locating notch 359. The bail 355 is normally held in its position shown by a spring 358, but during the aforementioned half of a machine cycle the link 335 will rock the cam member 327*a* and the latter will cam the bail 355, forcing the notch 359 to engage one or the other of two pins 360 and 361 carried by the aforementioned arm 310, depending upon the rocked position of the handle 21.

In adding or other machine operations in which the handle is not used, it is locked in its neutral position by the same bail 355, in which case the projections 357 are positioned between the pins 360 and 361.

Because the bail 355 is effective to lock the handle 21 during the first half only of the machine cycle, the handle may be rocked during the last half of the cycle in order to facilitate control of the machine by the operator. That is, the operator may rock the handle to effect a change from an additive to a subtractive operation or vice-versa before completion of a current cycle. Means are provided, however, to enable the machine to complete its current cycle.

It will be noted on reference to Fig. 9, that the ear 166 of the clutch dog 57 rides on the periphery of the clutch 56 throughout the major portion of every cycle. Therefore, the clutch control bar 146 will be held forwardly in its position shown in Figs. 11, 12 and 13. If the current cycle is an additive one, the minus control bell crank 158 will be held in its upper position shown in Figs. 12 and 13, due to the positioning of a shoulder 600 on the control bar 146 under the pin 157*a* of the bell crank. On the other hand, if the current cycle is a subtractive one, the minus control bell crank 158 will be held in a lower position, as shown in Fig. 11, wherein the inclined guide slot 156 in the clutch control bar 146 engages the pin 157*a* throughout such cycle and thus traps the bell crank in such subtract controlling position until the end of the cycle.

Assume the parts to be in their add control positions as shown in Fig. 12, due to initial movement of the handle (Fig. 2) into its rearward position 21*b* and that at the end of the first half of a current additive cycle, the handle 21 is moved forward to its subtract control position. The arm 310 will now be rocked counterclockwise toward its position shown in Fig. 11. The yieldable link 311 now tends to rock the arm 312 clockwise to lower the bell crank 158. However, since the bell crank 158 is now locked in its position shown in Figs. 12 and 13 by the shoulder 600 of bar 146, the link will collapse. At the end of the current additive cycle, the clutch control bar 146 will be allowed to retract to its normal position shown in Fig. 9, permitting the spring 317 of link 311 to expand, forcing the lever 312 clockwise to lower the bell crank 158. The pin 157*a* on the latter crank will now cam along the camming surface 212 of a slide 447 (Fig. 17) which is supported on the accumulator positioning control bar 50 by pins 450. The latter ride in slots 448 in the slide and are normally held against the forward edges of such slots (as best seen in Fig. 17) by a spring 451 tensioned between the slide and one of the pins 450. Thus, as the bell crank 158 is lowered, its pin 157*a* will move the elements 50 and 447 forwardly as a unit to lower the accumulator control hook 205 against the action of its relatively light spring 205*a* into a subtract setting. Substantially simultaneously, the pin 157*a* will engage a camming slot 156 in the clutch control bar 146, thereby again initiating operation of the clutch.

It should be noted that a pin 334 (Figs. 10, 11, 12 and 13) is carried by the bar 50 and rides along a camming surface 235 on the bell crank 312.

Should the handle 21 be moved rearwardly to effect additive cycling of the machine while the latter is in a mid-subtractive cycle due to the handle having been initially moved forwardly, the arm 310 will be rocked clockwise into its position shown in Fig. 12, tending to rock the arm 312 counterclockwise. However, the remaining parts at this time are located in their positions shown in Fig. 11. The camming surface 335 now cams against the pin 234, thus tending to aid the spring 205*a* (Fig. 17) to shift the control bar 50 and hook member 205 into their normal additive setting. Should the friction of the parts at this time resist such movement, the link 311 will be extended. Evenutally, in such current cycle, however, the accumulator positioning control elements 50, 214 and 205 will assume their additive setting, seen in Fig. 17, and the ear 318 on the arm 312 will engage the foot 319 of the clutch control bar 146, thus causing reengagement of the clutch to effect continued cycling of the machine.

Describing now the means for holding the stop slides 32 in proper rack arresting positions during multiplication and division calculations, the majority of such slides are provided with sets of combing teeth 322 (Figs. 2, 4 and 33) engageable by a locking bail 323. The latter is carried by arms 324 pivotally mounted on a pivot shaft 325 which is carried in elongated slots 326 formed in the side frames 254 and 255 as shown in Figs. 2 and 21.

The locking bail 323 is normally held in its illustrated locking position whereby to hold the various stop slides in the various digital positions in which they may be set, except during multiplicand and divisor entry operations, as will appear hereinafter. However, the locking bail is normally located in a forward position, due to shaft 325 resting in the forward ends of the slots 326 whereby to provide the gap 245 (Fig. 2) mentioned heretofore, and is moved rearward by the amount of such gap during multiplication and division operations. Thus, in orders where the slides 235 register zero, such slides will substantially contact the forward ends of the associated racks 31. Toward this end, the pivot shaft 325 is embraced at opposite ends thereof by cam slots formed in cam members 327 and 327a (Figs. 21 and 23). The latter are connected by a bail bar 329 and are pivoted on frame pins 328 and 329. The bail bar and cam members are normally urged in a clockwise direction into their illustrated positions by a spring 330 tensioned between a pin 331 carried by the cam 327 and a frame pin 332, whereby to hold the locking bail 323 in its normal forward position.

A pin 333 on the cam member 327 is normally engaged by a slot 334 formed on an actuator link 335. The latter is connected at 336 to a cam follower 337 pivoted on the forementioned shaft 64 and is provided with rollers 340 and 341 which engage diametrically opposite sides of a cam 342 which is keyed on the drive shaft 55.

A spring 343 is tensioned between the frame pin 332 and link 335 to normally hold the slot 334 in engagement with the pin 333. Thus, during multiplication and division operations, the link 335 will be drawn rearwardly at the start of each cycle, rocking the cam members 327 and 327a counterclockwise to force the locking bail 323 rearwardly by an amount equal to the gap 245 (Fig. 2). At approximately mid-cycle the cam 342 again returns the parts to their original positions.

Means are provided for rigidly clamping the various stop slides 32 in position during multiplication and division operations so as to withstand the shock incurred due to the racks 31 striking the same as the latter are driven forwardly. As shown in Figs. 2 and 33, a clamp bail 345 extends across the machine and is pivotally supported by trunnion bearings 346 formed in the frame plates 254 and 255. Springs 347 and 348 normally hold the clamp bail 345 out of contact with the stop slides 32. However, when the handle 21 is rocked fore or aft to effect multiplication or division operations, a corner of the shaft 260 cams against the actuating levers 350, pivotally supported at 351 and overlying extensions of the bail 345, thereby forcing the latter downwardly into contact with the stop slides and clamping the same against the upper edge of the rear leg 251 of the pulley bracket 252.

The frame plates 254 and 255 (Figs. 21, 28 and 31–33) supporting the multiply-divide mechanism are removably secured to the main frame plates 575 and 576 of the machine to permit ready removal and replacement of the multiply-divide mechanism for servicing, etc. For the purpose of bracing both pairs of plates and at the same time removably securing the former pair to the latter, the main plates 575 and 576 are each provided with lug 757 and a pilot lug 759, each fitted into a slot formed in a cross-brace 760. The latter brace extends between the frame plates 575 and 576. Each of the plates 254 and 255 is also provided with an upwardly extending lug 761 fitted into the slot in brace 760 into which extends the lug 757 of the associated main frame plate. The plate 255 is provided with a pilot lug 758 fitted into the same slot as the lug 759. A pin 762 is forced through openings in the adjacent plates, for example, plates 255 and 576 (Fig. 30), directly below the brace plate 760 to lock all three elements in place.

Since in multiplication and division calculations it is desirable to control the extent of movement of the racks 31 solely by the stop slides 32, means are provided for automatically releasing any amount keys which may have possibly been depressed prior to such multiplication and division calculations and incidentally to hold the aforementioned key lock bails 41 (Figs. 2 and 5) in outwardly rocked positions against the action of their springs 44 so that the racks may freely move forward without interference by the zero blocks 47. For this purpose the arm 310 (Fig. 10) is formed into an inverted V shape and engages a roller 780 carried on a bell crank 781 fulcrumed on the aforementioned frame pin 313. Another arm of the bell crank 781 is connected through a link 782 (see also Fig. 17) to the lower end of a vertical link 783. The upper end of the latter link is connected to a lever 784 pivoted upon a frame pin 53, the forward end of the lever overlying a key release lever 785. The lever 785 forms part of the key release mechanism (not shown) which, upon depression of the lever 785 acts to rock all key lock bails 41 outwardly, removing the zero blocks 47 from positions blocking the racks 31.

Normally, a spring 786 tensioned between the link 782 and a frame pin holds the link 782 to the left, thereby maintaining the link 783 in a position wherein a shoulder 787 thereof lies outside the path of movement of a pin 788 carried by the aforementioned bell crank 225. However, upon rocking of the handle 21 from its neutral position into its add or subtract controlling position, the arm 310 will cam the bell crank 781 counterclockwise and thus position the shoulder 787 over the pin 788. Accordingly, as the lever 225 is rocked at the start of the machine cycle initiated by the handle 21, the link 783 will be forced upwardly to rock the lever 784 and thus cause release of any depressed amount key and release of all zero blocks 47 from blocking relation with their respective racks 31.

*Multiplier-quotient counter*

The multiplier quotient counter 22 (Figs. 1, 2, 3, 28 and 33) comprises a series of denominationally arranged dials 272 arranged to be selectively actuated by the actuator 270, according to the position of the handle 21 laterally of the machine, as was described heretofore. The various dials 272 are independently and rotatably mounted on a counter shaft 362 which extends through vertical slots (one of which is shown at 363 in Fig. 21), in the side frames. The shaft 362 is normally held in its illustrated raised position by a toggle arrangement located at opposite sides of the machine. One such toggle arrangement is indicated in Fig. 24 and comprises an arm 369 pivoted at the upper end thereof on the shaft 362 and pivotally connected at 364 to one arm of a bail 365 which, in turn, is fulcrumed on the shaft 313. A pin 367 on the bail 365 is normally engaged by a shoulder formed on a link 368, whereby to hold the bail against a frame pin 370.

Each dial 272 has fast thereto a ten-toothed gear 371 adapted to be meshed by a rack gear extension 373 formed integral with an aligned one of the racks 31. A detent 374 is located in alignment with each gear 371 and is pivoted on a cross shaft 375, a tension spring 376 yieldably maintaining the detent in engagement between two of the teeth of gear 371 so as to align a numeral on the dial in registry with a respective sight opening 377.

As shown particularly in Figs. 3 and 33, each of the dials 272 is provided with ten laterally extending teeth 378, one of which teeth 378a extends a greater distance than the rest and is aligned with a zero stop ear 380 formed on a stationary frame brace member 381. Normally, however, the counter dials are located above the zero stops 380 and thus are not affected thereby.

*Counter-actuator mechanism*

The counter actuator 270 (Figs. 2 and 33) is rotated one-quarter revolution during each cycle while the machine is performing multiplication or division, whereby to advance an aligned dial 272 one increment in an appropriate direction. That is, during multiplication operations and when the handle 21 is rocked rearwardly toward the rear of the machine to effect additive entries, the actuator is rotated clockwise, causing the dial to progress from one numeral increment to the next higher numeral increment.

On the other hand, during division operations, and when the handle 21 is rocked forwardly to effect subtractive entries, the actuator is rotated clockwise to progress its dial, whereas, when the handle is rocked rearwardly during such division operations, the actuator is rotated counterclockwise to retrogress the dial.

This reversal of the direction of rotation of the counter dials during multiplication and division problems is predetermined by the depression of one or the other of the two factor entry keys 20 and 28 as an incident to entry of multiplicand or divisor factors, as will appear hereinafter.

The means for intermittently rotating shaft 271 and actuator 270 comprises a link 384 (Figs. 18, 19 and 20) arranged to be reciprocated in one direction or the other from its neutral illustrated position.

This is accomplished by a pair of juxtaposed cams 385 and 386 keyed on the drive shaft 55. The latter cams operate respective ones of a pair of cam followers 387 and 388 pivotally supported on the aforementioned cross shaft 64. Tension springs 390 and 391 maintain the respective cam followers 387 and 388 in contact with their cams to locate pins 391 and 392, respectively, thereon in registry with notches 393 and 394. The former notch is located in an extension 395 of the link 384, whereas the notch 394 is formed in the link proper.

The link 384 is provided with an elongated slot 396 at its forward end which embraces a stud 397 carried on an arm 398 fastened to the right hand end of the handle controlled shaft 260.

A pair of actuating pawls 400 and 401 are pivotally mounted at their remote ends on the link 384 adjacent the forward end thereof, and a spring 402 is tensioned between the pawls to normally retain the same in their relative positions shown in Figs. 18 and 20. The latter pawls are adapted to coact with four equally spaced pins 403 mounted on a pinwheel 404 attached to the right hand end of the actuator shaft 271.

A centralizer 405 is provided to normally locate the pinwheel in its position illustrated in Fig. 18. The centralizer is pivoted on a frame pin 406 and is urged downwardly by a tension spring 407 to maintain a roller 408, carried thereby, in engagement with two of the pins 403.

In the normal arrangement of the parts as shown in Fig. 18, reciprocation of the link 384 in either direction from its illustrated position, in response to depression of one of the various machine control bars, will result in one or the other of the actuating pawls 400 and 401 passing between two of the pins 403 without engaging the same. However, when the handle 21 is rocked forwardly to effect subtractive entries, the lever 398 will lower the forward end of the link 384 to its position shown in full lines in Fig. 20, thereby aligning the actuating pawls 400 and 401 with the two lower pins 403. Consequently, reciprocation of the link in one direction or the other, as will appear hereinafter, will cause an appropriate one of the actuator pawls to advance the pinwheel 404 and consequently the actuator 270 through an angle of ninety degrees in one direction or the other.

On the other hand, rocking of handle 21 rearwardly to effect additive entries will result in positioning the link 384 above its normal position shown in Fig. 18, wherein the pawls 400 and 401 will assume their dotted line positions 400a and 401a (Fig. 20), in line with the upper two pins 403. Thus, reciprocation of the link 384 will result in rotation of the pinwheel 404 in a direction opposite to that which would have resulted if the link 384 were in its lowermost position.

*Multiplicand entry controls*

The multiplicand entry key 20 (Figs. 1, 18, 21 and 22) is effective, upon depression, to cause entry of a multiplicand factor from the amount keys 9 into the stop slides 32. The stem of key 20 is provided with elongated slots 411 and 412 guided over frame pins 413 and 414, respectively. A spring 415 tensioned between an ear 416 on the lower end of the key stem and the frame pin 413 normally holds the key in its illustrated raised position.

Means are provided which are responsive to depression of the key 20 for laterally setting handle 21 and consequently the flexible belt 236 and slides 32 one-half denominational order to the left of that shown in Figs. 1, 23 and 33, whereby to align the slides 32 with the racks 31 so that the racks may be rendered effective to set the slides. For this purpose, the ear 416 of key 20 overlies the aforementioned link 335, and upon depression of the key 20 the link 335 is lowered, moving a notch 417 therein into embracement with a pin 418 extending from a bail 420. The latter is pivoted on a frame pin 421 and is coupled, as aforementioned, through the pin and slot connection 49 to the lever 304, and is provided with a lug 422 which is limited in counterclockwise movement against the pivot pin 305. In the ensuing machine cycle initiated by key 20, the link 335 will be drawn rearwardly, rocking the bail 420 clockwise and consequently lever 304 counterclockwise. The latter lever 304, through its connection 303 to the lever 301 (see Fig. 28) will cause roller 300 to engage a foot 423 of the bellcrank 294, rocking the same counterclockwise a slight amount, thereby shifting the slide 290 leftward to locate the handle in its next denominational position to the left into the position shown in full lines in Fig. 29.

In order to prevent overthrow of the handle 21, belt 236, etc., beyond the latter position by the slide 290, a hooked tip 424 is pivotally mounted at 425 on the slide 290 and is normally urged by a spring 426, extending between the tip and the slide, into its position illustrated in Fig. 28, wherein an ear 427 on the tip limits against the slide. However, as the slide 290 is moved to the left, an arcuate surface 424a of the tip 424 contacts a roller 428 rotatably mounted on the top plate 273, thereby camming the tip 424 into the position shown in Fig. 29 wherein it prevents further leftward movement of the handle. During the mid portion of the cycle, however, the parts are returned to their normal positions shown in Fig. 28, permitting subsequent shifting of the handle in either direction laterally of the machine.

The lock bail 323 (Figs. 2, 27 and 33) must be removed from locking engagement with the slides 32 during setting of the latter by the racks 31 in multiplicand entry operations. For this purpose, the bail 420 (Figs. 2 and 21) is connected through a link 430 to an extension 431 of the lock bail 323. Consequently, as the bail 420 is rocked clockwise by the link 335 at the start of a cycle, the lock bail 323 will be rocked downward about its pivot shaft 325 sufficient to clear the combing teeth 322 of the various slides 32.

It will be well to note at this point that not all of the stop slides 32 have the full complement of ten combing or locking teeth thereon. Only those slides normally directly associated with the racks 31 when the handle 21 is moved to its next denominational position to the left of its initial position shown in Figs. 1, 26 and 33 have ten teeth. Such slides comprise a group 239 (Figs. 26, 27 and 33). Thus, the locking bail 323 is effective to lock the latter group of slides in any of the ten different numerical positions to which they may be set by the racks 31, the locking bail permitting the slides 32 to be moved laterally of the machine and around the bail while retaining such slides in their differentially set longitudinal positions.

The three leftmost stop slides **32*a*, 32*b* and 32*c* are only effective as zero stops to block advance of one or more of the three leftmost racks 31 when the handle 21 is moved into one or another of its three right-hand denominational positions, i. e., to the right of its initial position of Fig. 26, the latter occurring when multiplying by decimal multiplier digits. Therefore, the latter three stop slides do not require the aforementioned combing teeth, and in fact are rigidly secured to the belt 236 by their rivets 241*a* and 242*a*. Also, in order to reduce friction occurring due to the sliding of the combing teeth of the various slides along the lock bail 323, the three zero stop slides 32*a*, 32*b* and 32*c* are each provided with a single tooth 1235 lying directly to the rear of the lock bail but normally spaced therefrom a minute amount. Thus, in multiplication and division calculations wherein the handle 21 is moved to a decimal position, the belt 236 will yield slightly as the left-hand rack or racks 31 strike the respective slide and the tooth 1235** thereof will limit against the lock bail.

The two rightmost stop slides **32*d* and 32*e* which are normally located below the lock bail 323 likewise serve only as zero stop slides, and accordingly are constructed in a manner similar to the zero stop slides 32*a*, 32*b* and 32*c*. Thus, since the latter slides may in many cases be located below the lock bail 323** during the aforementioned multiplication and division calculations, they will not impede the lowering of the lock bail.

On the other hand, the third rightmost stop slide **32*f* is constructed with nine combing teeth, the foremost one of which normally lies directly behind the lock comb 323 in the same manner as the single tooth 1235 located on the various zero stop slides. This construction permits the handle 21 to be moved to its rightmost denominational position, while preventing interference between the lock bail 323 and slide 32*f*, in which case the slide 32*f* will be located below the bail. At the same time, the slide 32*f* enables a multiplicand factor to be entered therein with the handle 21 manually located in its fifth denominational position from the right, in which case the slide 32*f* would be held in alignment with the lowermost denominational (right-hand) rack 31** and accordingly differentially positioned thereby.

The multiplicand entry key 20 is effective to condition the counter actuating mechanism of Figs. 18, 19 and 20 to appropriately drive the actuator 270 (Fig. 2) if such actuating mechanism is not already so conditioned. Figs. 18 and 19 illustrate the counter actuator mechanism in such condition. In this case, the rear end of the link 384 is maintained by a spring 434 in a lowered condition wherein the notch 394 embraces the pin 392 of cam follower 388. Thus, during an ensuing multiplying operation, the cam 386 will be effective to drive the link 384 rearwardly from its normal neutral position, causing the pawl 400 to operate one or the other of adjacent pins 403, depending on the rocked position of the handle 21.

However, in case a previous operation was one of division, the rear end of link 384 will be held in an upper position wherein the notch 393 thereof embraces the pin 391 so that operation of the machine will cause the cam 385 and follower 387 to force the link 384 forwardly of its neutral illustrated position, thereby causing the pawl 401 to actuate one or the other of the adjacent pins 403, again depending upon the direction in which the handle 21 is rocked. The link 384 is held as aforementioned, in its elevated position by a two-part lever 435 pivoted on a frame pin 436 and held in a counterclockwise rocked position by a latch 437. The latter is fulcrumed at 438 and urged toward the left in Fig. 18 by a tension spring 440 whereby to latch a shoulder 441 over an ear 442 on the lever 435. Now, when the multiplicand entry key 20 is depressed as an incident to a multiplication calculation, the ear 416 thereof will cam the latch 437 clockwise, releasing the lever 435 to the action of spring 434 so that the link 384 may return to the position shown in Figs. 18 and 19.

The lever 435 is in two parts, **435*a* and 435*b*, both pivoted on the pin 436. A spring 439 extends between the part 435*a* and an extension of part 435*b*, causing an ear 435*c* of the latter part to limit against the part 435*a*** and thus normally hold the parts in their relative positions illustrated.

The multiplicand entry key 20 is also effective upon depression to cause setting of the accumulator 8 (Fig. 5) into its neutral or nonadd position and to cause engagement of the clutch and operation of the motor. As shown in Fig. 21, the ear 416 of key 20 overlies the forwardly extending arm of a bail 443 pivoted on the aforementioned cross shaft 313. The bail 443 extends across the machine and terminates in an arm 444 (Figs. 10 to 13, inclusive) having a pin 445 thereon, the latter being aligned with a camming surface 446 formed on a forward extension of the slide 447, which, it will be recalled, normally functions as an integral part of the accumulator positioning bar 50 (Fig. 17). The pin 445 also lies directly behind the foot 319 of the clutch control bar 146 (see also Fig. 10). Thus, as the bail 443 is rocked counterclockwise, due to depression of the key 20, the pin 445 will first cam the slide 447 and consequently bar 50 into such a position as to locate the accumulator positioning control hook member 205 in its neutral nonadd position. Thereafter, the pin 445 will strike the foot 319 and pick up the clutch control bar 146, causing operation of the motor and engagement of the clutch.

Means are provided to latch the key 20 in a depressed position and to release the same during the mid portion of the ensuing machine cycle. As shown in Fig. 22, a latch 448 is pivoted on the frame pin 414 and is urged clockwise by a tension spring 449 to maintain a latching ear 450 in engagement with the rear edge of the stem of key 20. Upon depression of the key, a latching shoulder **20*a* thereon passes below the ear 450, thus latching the key depressed. A release link 451 is pivoted at 452 to the lower end of the latch 448 and is urged downwardly by a spring 453 tensioned between the link and the lower tail of the latch 448. Link 451 rides on the top of the aforementioned pin 418 carried by the bail 420. As the latter bail is rocked clockwise by link 335 during a multiplicand entry operation, the pin 418 passes to the rear of a shoulder 454 on the link 451. Now, toward the mid portion of the cycle and when the link 335 is returned forward by cam 342, the pin 418 will pick up the link 451 and carry it forward, thereby rocking the latch 448 clockwise to release the key 20. Immediately after the key 20 is released a projection 51 on the link 451 will engage a frame pin 52, thereby disengaging the shoulder 454 from the pin 418** so that the latter may continue forward.

*Divisor entry controls*

The divisor entry key 28 (Figs. 1, 18, 21 and 22) is effective upon depression to cause entry of a divisor factor from the keyboard into the stop slides 32. The key 28 is mounted for depression upon frame pins 455 and 456 in a manner similar to that of key 20, and a spring 457 is extended between the upper frame pin 455 and the lower end of the stem of key 28 for normally holding the latter in its illustrated raised position. An ear 458 is formed on the lower end of the stem of key 28, and upon depression of the latter, is effective to lower the link 335 into coupling engagement with the pin 418 on the bail 420 in the same manner as if effected by the key 20. Thus, in the ensuing divisor entry operation of the machine, the lever 304 will be rocked to actuate bellcrank 294 (Fig. 28) and slide 290 to position the handle 21 in the next higher denominational position in a manner identical to that followed in the aforementioned multiplicand entry operation. Likewise, the slide locking bail 323 (Fig. 2) will be released due to its connection, through link 430, to the bail 420.

It will be noted that the ear 458 of key 28 overlies the forwardly projecting arm of bail 443 (Figs. 10–13, inclusive, and 21) whereby depression of the key 28 will cause operation of the motor, engagement of the clutch, and positioning of the accumulator in its neutral or nonadd condition in the same manner as is effected by the key 20.

The divisor entry key 28 is effective upon depression to condition a counter actuator mechanism to appropriately drive the counter during succeeding division operations so as to positively count subtractive cycles of operation, and subtractively count additive cycles if such actuating mechanism is not already set in that condition. As shown in Fig. 18, the ear 458 of key 28 overlies the forward end of the aforementioned lever 435 and is thus effective to rock the latter counterclockwise until latched by latch 437. In such condition, the lever 435 will hold the rear end of the link 384 in a raised position wherein the notch 393 thereof will embrace the pin 391 of cam follower 387. Thus, as noted in the preceding section, the cam 385 and follower 387 will cause a reciprocation of the link 384 forwardly of its neutral position during subsequent division cycles of the machine.

In order to hold the key 28 depressed throughout the first portion of a divisor entry operation, the ear 458 thereof is adapted upon depression of this key to move below a latching shoulder 460 (Fig. 22) of the aforementioned latch 448. Thus, the key will be latched in depressed position until release of the latch through the link 451 by bail 420 and actuating link 335.

Means are provided to prevent simultaneous depression of the divisor entry key 28 and the multiplicand entry key 20. Referring to Figs. 18 and 21, each of the above keys has an inclined camming edge 462 formed thereon and cooperable with an eccentric interlocking disc 463 pivoted on a frame pin 464. Depression of one or the other of the keys 20 and 28 will cause the camming surface 462 thereof to rotate the disc into a position blocking the other of the keys from depression.

*Multiplier-quotient counter clearing controls*

The multiplier-quotient key 23 (Figs. 1, 13 and 24) is effective upon depression thereof to cause clearing of the multiplier-quotient counter 22 and recording of the amount registered thereon onto the tape 103 (Figs. 5 and 15).

The key 23 is provided with elongated slots guided for vertical movement on frame pins 466, 467 and 468. A spring 470 tensioned between the pin 467 and a pin 471 on the stem of key 23 normally holds the same in its raised position shown in Fig. 24.

The pin 471 overlies the aforementioned link 368, the rear end of which is pivotally connected at 472 (Fig. 17) to the three-armed lever 206 associated with the accumulator positioning hook member 205. Accordingly, upon depression of the key 23, the forward end of the link 368 will be lowered to cause a slot 473 (Fig. 24) therein to embrace the aforementioned pin 367 extending from the bail 365, which it will be recalled, forms part of the toggle arrangement supporting the counter 22.

The key 23 is further provided with an ear 474 which overlies a tail 475 (Figs. 10 and 13) extending from the arm 444 of the clutch operating bail 443. Thus, as the key 23 is depressed into its position illustrated in Fig. 13, the arm 444 will be forced counterclockwise to cause engagement of the clutch and setting of the accumulator into its nonadd condition in the same manner as described in connection with the multiplicand and divisor entry controls.

As the machine cycle ensues under control of the key 23, the link 368, upon moving rearwardly at the start of the cycle, rocks the bail 365, drawing downwardly on the link 363 to lower the counter shaft 362 (Fig. 2) and thus mesh the various dial gears 371 with the rack sections 373 of the various drive racks 31. Also, due to lowering of the counter, the zero stop lugs 380 (Fig. 2) will now be in the path of the long teeth **378*a* of the counter dials. Accordingly, the racks will drive the dials 272 toward zero registration in a clockwise direction until arrested by the zero stops 380 (Fig. 3). The racks 31 will thus move to digital positions indicative of the value previously registered on the counter dials 272 and this amount will be recorded by the printer mechanism in the usual manner. During the mid portion of the cycle and before the racks are returned to their initial positions, the counter is raised to demesh the dial gears 371 from the rack sections 373**.

In order to retain the key 23 in a depressed condition throughout the first half of a machine cycle, a latch 477 is provided, the latter being pivoted on the shaft 260 and urged counterclockwise by a spring 480. The spring normally holds the latch against the forward side of the ear 474 on the stem of the key 23. As the latter is depressed, the latch 477 will move into latching position relative thereto.

A tip member 481 is pivoted at 482 on the link 368 and also has a pin and slot connection 483 with the link permitting the same to be held in the relative position shown in Fig. 24 by a tension spring 484 extending between the tip and the link. As the lnik is first lowered by the key 23, the tip member 481 will rest upon an ear 600 of the latch 477. Thereafter, as the link 368 is drawn rearwardly and later returned, a shoulder 601 thereon will engage the ear 600, rocking the latch 477 to release the key 23. As the link 368 is returned it is urged upwardly to the position shown in Fig. 24 by a spring 54.

Since the foregoing operation is a counter clearing operation it is desired that the racks be free to move forwardly until arrested by the various zero stops 380 (Fig. 3) as the latter are engaged by the long teeth **378*a* of the counter dials 272. Accordingly, the amount key locking bails 41 (Figs. 2 and 5) are held outward during this operation to maintain the zero blocks 47 out of blocking relation with the racks 31. To accomplish this, key 23 is coupled through a pin and slot connection 602 to the aforementioned bellcrank 781. Thus, when the key 23 is depressed, the link 782 (see also Fig. 17) will be moved rearward to position the shoulder 787 of link 783 over the pin 788 of lever 225. Thus, as the latter lever is rocked by cam 223 at the start of the cycle, the various key locking bails 41** will be removed from blocking relation with the racks.

*Printer controls*

In performing certain types of calculations, such as addition and subtraction, it is desirable to print all factors and results. However, in multiplication and division calculations, it is desired to print only the factors and results and not the repeated entries of the factors. Thus, in multiplication operations, and as noted on the sample tape (Fig. 15), only the multiplicand factor 24, the multiplier factor 25 and product 26 are printed. Likewise, in division calculations, only the dividend factor 27 (Fig. 15), divisor factor **27*a*, quotient 30 and remainder 29 are printed, one directly below the other. In order to automatically suppress the printing of the repeated entries of the multiplicand and divisor factors, means are provided under control of the handle 21 for blocking operation of the printnig mechanism. Referring to Fig. 36, the aforementioned arm 398 attached to the rock shaft 260** has an inverted V-shaped camming formation 603 formed on the under edge thereof and engaging a roller 604 on a lever 605. The latter is pivoted on a frame pin 606 and is connected through a pin and slot connection 607 to a hook lever 608. The latter is in the form of a bail and is pivoted on a frame pin 609. When the handle, and conseqently shaft 260, is rocked in either direction from its neutral position, the arm 398 will cam lever 605 counterclockwise, raising the hook member 608 to a position directly behind the aforementioned roller 121 (see also Fig. 17) carried on the arm 122. It will be recalled that the latter arm is fastened to the printer control shaft 109. Thus, the printer shaft will be prevented from rocking during the printing phase of a machine cycle as long as the multiply-divide handle is held rocked in either of its settings.

Means are also provided under control of the handle 21 to disable the paper and ribbon feeding mechanism described theretofore. For this purpose the hook member 608 is coupled through a pin and slot connection 505 to an arm 506 fastened on a rock shaft 507 (see also Figs. 34 and 35).

A second arm 508 (Fig. 34) also fastened to the shaft 507, lies in contact with an ear 510 on the aforementioned hook member 493. Thus, as the handle 21 is rocked to either of its positions, consequently rocking the levers 605 and 608 (Fig. 36), the arms 506 and 508 will be rocked counterclockwise to force the hook member 493 about its pivot 494 and against the action of spring 495 to uncouple the arm 488 from the cam follower 490, thereby preventing actuation of the ribbon and paper feed pawls 502 and 487, respectively.

It is possible, as mentioned heretofore, to rock the handle 21 from its add to subtract settings and vice versa before completion of a current cycle controlled thereby, and since the paper and ribbon advancing mechanisms are actuated toward the end of a cycle, it is necessary to retain the printer, paper and ribbon disabling mechanisms in effective condition independently of the handle 21 during the latter stages of each cycle and until the last stage of the cycle is reached. For this purpose, the hook member 608 is provided with a pin 512 arranged to be engaged by the upper hooked end of a lever 513. Lever 513 is pivoted on a frame pin 514 and is urged clockwise by spring 515 to hold a camming nose 516 thereof in engagement with a roller 517 carried on a disc 518 which is keyed on the drive shaft 55. When the machine is in full cycle condition, as shown in Fig. 36, the upper end of the lever 513 is held to the left of pin 512. However, just after commencement of a cycle, the spring 515 is permitted by roller 517 to rock the lever 513, thus permitting the same to latch the hook 608 in a clockwise rocked position if so rocked by the handle 21. Just before completion of the cycle, the roller 517 will again engage the nose 516 of the lever, rocking the same counterclockwise to release the hook member, permitting the same to be turned by a spring 520 to its ineffective position.

*Symbol printing*

Means are provided to properly identify the various factors and results of different calculations recorded on the tape 103 as indicated in Fig. 15. For this purpose, a symbol printing section is provided in the printer mechanism, such section including a printing wheel similar to the wheels 106 but having symbol type located around the periphery thereof as indicated in Fig. 8. The latter symbol dial is located directly to the right of the lowermost denomination numeral printing dial. The symbol dial is carried by a printing lever similar to the lever 108 (Fig. 5) and is entrained through an idler gear (not shown) with a gear 113a (Fig. 24) similar to the gears 113. The latter gear is continuously entrained through a pinion assembly 521 with a special symbol rack, located at the left-hand side of the machine, part of the rack being shown at 522. The latter is mounted for longitudinal fore and aft movement on guide pins, one of which is shown at 523 embraced by elongated slots, as at 524, formed in the rack.

The symbol rack 522 is yieldably advanced along with the remaining drive racks 31 (Fig. 2) by the aforementioned rack drive shaft 68. To provide such a yieldable drive, a drive arm 525 is pivoted on the rack at 526 and is urged upwardly by a spring 527 tensioned between the arm and the rack 522 to normally maintain a notch 528 formed in the arm in engagement with the shaft 68. The rack is released for forward movement when a shoulder on the bar 50 thrusts against a pin 50a (Fig. 17) to rock a latch 525a (Fig. 24) pivoted upon a frame pin 529.

The rack 522 is provided with a series of stop shoulders 530 cooperable with respective ones of the aforementioned pins 157 associated with the several machine control bars 13, 14, 17 and 19. The shoulders associated with the control bars 17 and 19 are carried by a slide 531 mounted on the rack 522, but for the purposes of the present disclosure the slide may be considered as part of the rack. The shoulders 530 are so spaced relative to their associated pins 157 as to enable the rack to differentially advance from one to four increments, depending upon the particular bar depressed, and thus cause appropriate symbol type on the symbol printing wheel to be registered for printing.

Means are provided for printing a divisor symbol in response to depression of the divisor entry key 28. For this purpose, the symbol rack 522 is limited in its outward movement by engagement of a pin 532 thereon against a shoulder 533 on a blocking lever 534. This lever is provided with a vertical slot 535 embracing a frame pin 536 which permits a limited vertical as well as rocking movement of the blocking lever. A foot 537 on the blocking lever is arranged to rest on a headed stud 538 which is slidably mounted in a bearing formed in an ear 540 of a bail 541. The stud 538 is urged upwardly by a compression spring 542 interposed between the head of the stud and the ear 540. The stud is adjustably limited in such upward movement by a nut 543 located under the ear 540.

The bail 541 is pivoted on the aforementioned cross shaft 313 and has a forwardly projecting arm 546 (Fig. 18) which is held in engagement with the under surface of a bend 547 formed in the lever 435 by means of a tension spring 548.

When the divisor entry key 28 is depressed, the latter will rock the lever 435 downwardly and, it will be recalled, the latch 437 will become effective to thereafter maintain the lever in such rocked condition. Thus, the bail 541 will be rocked counterclockwise, raising the blocking lever 534 from the position shown in Fig. 24 to that shown in Fig. 25. A spring 549 tensioned between the blocking lever 534 and the ear 540 of the bail 541 is normally effective to urge the blocking lever 534 clockwise about the pin 536 to a position wherein the forward end of the lever may fulcrum about the under side of the guide pin 468 for the key 23. Consequently, as the lever 534 is raised by the bail 541, the blocking shoulder 533 thereof will be positioned in line with the pin 532 on the rack 522. Thus the rack will be advanced to cause the symbol printing dial to register the divisor factor symbol 531.

Depression of the multiplicand entry key 20, on the other hand, will release the latch 437 (Fig. 18), permitting the lever 435 and bail 541 to return to their positions illustrated in Figs. 18 and 24, thereby allowing the blocking lever 534 to drop below the path of travel of the pin 532. Accordingly, the symbol rack 522 will be permitted to advance its fullest extent until the rear end of the guide slot 524 in the rack strikes the frame pin 523, thereby causing the symbol dial to advance to a position where it will print a common multiplicand-multiplier symbol 550, identifying the multiplicand factor.

The aforementioned keys 20 and 28 also predetermine the particular symbol to be printed under control of the multiplier-quotient key 23, depending on whether such key is depressed as an incident to multiplication or division calculations. An ear 551 (Figs. 24 and 25) formed on the stem of key 23 directly overlies the forward end of blocking lever 534. When, as noted before, the multiplicand entry key 20 has been previously depressed, the bail 541 and lever 534 will be located in their lowered positions shown in Fig. 24. Now, should the key 23 be depressed to effect clearing of the counter 22 and printing of the amount registered thereby as a multiplier factor, the ear 551 will rock the blocking lever 534 counterclockwise about the frame pin 536. However, this movement will be insufficient to position the shoulder 533 in the path of the pin 532, and consequently, the rack 522 will be permitted to advance to its fullest extent in the same manner as caused by the previous depression of the multiplicand entry key 20. Therefore, the same symbol 550 will be printed opposite the multiplier factor.

In the event the divisor entry key 28 has previously been depressed, the bail 541 will thereafter be held in its position illustrated in Fig. 25 holding the blocking lever 534 raised and positioning the lever 534 in a location wherein the blocking shoulder 533 is located in the path of the pin 532. Now, should the key 23 be depressed to clear the counter and print the divisor factor, the ear 551 will rock the blocking lever 534 about the stud 538 as a fulcrum and thereby position a second blocking shoulder 552 in the path of the pin 532, thereby limiting the movement of rack 522 to a position wherein it will cause the symbol printing dial to print the quotient symbol 539 (Fig. 15).

*Speed control*

As noted hereinbefore, the printing instrumentalities of the machine are not utilized during the actual multiplication and division calculations and since such instrumentalities normally limit the speed of operation of a machine of this type, it is desirable to increase the speed of the machine during multiplication and division operations. This is especially so since in the latter type of operations, repetitive cycles are required which would otherwise prolong the completion of such calculations. Therefore, an automatic speed control mechanism is provided for controlling the machine motor in accordance wtih the type of operation being performed.

Although the machine motor is not shown, the shaft 560 (Figs. 37 and 38) thereof carries a flyweight bracket 561. Pivot pins 562 and 563 on the bracket pivotally support flyweight levers 564 for movement about axes extending at right angles to the axis of rotation to the motor shaft. A ball 565 is mounted to freely move in a hole formed axially of a hub 566 secured to the bracket 561.

The center of gravity of each of the flyweight levers 564 lies to the right (Fig. 37) of the respective pivot pins 562 and 563 so that as the motor accelerates, the inner adjacent ends of the flyweight levers move through longitudinally extending slots in the hub 566 and thereby force the ball 565 outwardly against an ear 567 of a lever 568. The latter is pivoted at 570 on a stationary bracket 571. A tab 572 on the lever overlies a plunger 573 of a normally closed switch, generally indicated at S, located in the motor circuit. Thus, as the motor accelerates, the lever 568 will be rotated counterclockwise, about the pivot 570, as viewed in Fig. 38, to momentarily force the plunger 573 inward to open the switch circuit and thus permit deceleration of the motor.

The aforementioned governor is initially set at a predetermined speed commensurate with the desired speed for driving the machine during such calculations as embody printing operations. For this purpose, a compression spring 574 is interposed between the ear 567 of lever 568 and an adjusting screw 569 threaded in an extension of the bracket 571. The spring 574 thus places initial inward pressure against the lever 568 and flyweights 564 and this is sufficient to overcome the action of a light tension spring 567a extending between the ear 567 and the outer end of the bracket 571.

In order to increase the motor speed during multiplication and division operations, the aforementioned hook member 608 (Fig. 36) is pivotally connected at 577 to the upper end of a cam slide 578, the lower end of which is bifurcated at 580 to slidably embrace the outer extremity of the bracket 571. A camming arm 581 is pivotally mounted at 582 on the slide 578 and is provided with limiting ears 583 and 584 adapted to engage opposite side edges of the slide. A spring 585 is tensioned between the ear 583 and an ear 586 on the slide to normally hold the arm 581 in the position shown in Fig. 37. The lower tip of the arm 581 is provided with a camming surface 587 located directly above the ear 567 of the lever 568.

As the multiply-divide handle 21 is rocked into one or the other of its alternate settings to effect multiplication or division operations, it will, through the aforementioned linkage, rock the hook 608 clockwise, lowering the slide 578 and forcing the arm 581 into camming engagement with the lever 568. Therefore, the additional pressure of spring 585 is imposed upon the switch control lever 568 to reduce the effect of the flyweight levers 564 and thus permit a higher speed to be obtained during such multiplication and division operations.

*Résumé*

It will be noted from the foregoing description of the machine and its operation that the factors and results of various calculations will be entered and computed in proper decimal relationship. In this respect all factors entered into the keyboard are preferably entered about a decimal point position located between the third and fourth rows of amount keys 9, counting from the right.

In order to properly indicate the decimal points on the tape, as at 590 (Fig. 15), a suitable decimal point printing device (not shown) is provided on the printer to invariably print the decimal points between the third and fourth lowermost denomination digits of an amount.

Likewise, all multiplicand and divisor factors are normally entered in proper denominational relationship in the various stop slides 32 (Fig. 2) during multiplicand and divisor factor entry operations. Accordingly, the proper decimal relationship is retained during multiplication and division, wherein the stop slides are shifted across the machine into different denominational relationships with the racks 31. Thus, the multiplier and quotient factors are properly entered in the counter 22 about a decimal point position located between the third and fourth counter dials from the right.

In order to visually indicate this position, a decimal pointer 591 is adjustably mounted on a rail 592 attached to the cover 194 of the machine, the pointer being normally located in its position illustrated in Fig. 1.

It will be further noted that a multiplicant or divisor factor once set up on the slides 32 will be retained therein until a new factor is subsequently entered. Thus, the machine readily lends itself to such problems as involve constant multiplicand and divisor factors.

Likewise, the machine is capable of performing chain multiplication calculations, the resultant product from each intermediate multiplication being totalled out of the machine accumulator and simultaneously entered into the stop slides by depression of the multiplicand entry key 20.

What we desire to secure by United States Letters Patent is:

1. In a calculating machine, the combination comprising a register, denominationally arranged differential actuators for said register, value selecting devices for controlling said differential actuators, denominationally arranged stop elements settable by said differential actuators and selectively adapted to control the extent of movement of said differential actuators, a support for moving said stop elements into different denominational relationships relative to said differential actuators, an aligning device for locating said stop elements in set position, said aligning device being adapted to maintain said elements in set positions throughout the movement of said support, means for selectively moving said aligning device into and out of cooperative relation with said stop elements, means for advancing said actuators in a forward direction, and means responsive to said last mentioned means upon operation thereof for moving said aligning device in an opposite direction.

2. In a calculating machine, the combination comprising a register, denominationally arranged racks movable in a predetermined direction for actuating said register, value selecting devices for controlling movement of said racks into different positions, denominationally arranged stop slides movable parallel to said racks, means for selectively causing said racks to set said stop slides into different positions, teeth on said stop slides, an aligner extending across said stop slides and normally engaging said teeth thereof whereby to maintain said stop slides in set positions, means responsive to operation of said first-mentioned means for moving said aligner from engagement with said teeth during movement of said racks, control means for selectively causing said stop slides to arrest said racks in positions corresponding to the set positions of said stop slides, said last-mentioned means being ineffective to move said aligner from said slide teeth, means for moving said stop slides along said aligner and into different denominational relationships relative to said racks, and means controlled by said control means for moving said aligner in said predetermined direction.

3. In a calculating machine, the combination comprising a register, denominationally arranged longitudinally movable racks for actuating said register, valve selecting devices for controlling movement of said racks into different positions, denominationally arranged stop elements movable parallel to said racks, means for selectively causing said racks to set said stop elements into different positions, a movable support for positioning said stop elements into different denominational relationships relative to said racks, means normally positioning said support to maintain said stop elements spaced away from cooperating ones of said racks in the direction of movement of said racks, means for selectively causing said racks to advance until arrested by said stop elements, and means responsive to operation of said last-mentioned means for moving said stop elements toward said racks in a direction opposite the direction of movement of said racks and by an amount substantially equal to the original spacing between said racks and said stop elements.

4. In a calculating machine, the combination comprising a register, denominationally arranged differential actuators for said register, a pair of spaced drum elements, means for supporting said drum elements for rotation, a flexible support extending around and carried by said drum elements, a plurality of denominationally arranged stop slides carried by said support and movable thereby into different denominational relationships relative to said actuators, said slides being differentially settable into different positions and adapted to arrest associated ones of said racks in corresponding positions, an aligning device normally maintaining said stop slides spaced away from cooperating ones of said actuators in the direction of movement of said actuators, means for selectively causing said actuators to advance until arrested by said stop slides, and means responsive to operation of said last mentioned means for moving said aligning device toward said actuators by an amount substantially equal to the original spacing between said actuators and said stop slides.

5. In a calculating machine, the combination comprising a register, denominationally arranged differential actuators for said register, a pair of spaced drum elements, means supporting said drum elements for rotation, a flexible support extending around and carried by said drum elements, a plurality of denominationally arranged stop slides carried by said support and movable thereby into different denominational relationships relative to said actuators, said slides being differentially settable into different positions and adapted to arrest associated ones of said racks in corresponding positions, teeth on said slides, an aligning bar engageable with said teeth for maintaining said slides in set positions, and means for moving said aligning bar in the direction of movement of said racks whereby to vary the spaces between said slides and said racks.

6. In a calculating machine, the combination comprising a register, denominationally arranged racks for actuating said register, value selecting devices for controlling movement of said racks into different positions, a pair of spaced drum elements, means rotatably supporting said elements, a flexible support carried by said elements and movable laterally relative to said racks about said elements, denominationally arranged stop slides, means slidably supporting said stop slides on said flexible support, means normally maintaining said support in a position to locate said stop slides out of alignment with said racks, and a device for simultaneously positioning said support to align said stop slides with said racks and for causing said racks to advance under control of said value selecting devices whereby to adjust said stop slides.

7. In a calculating machine, the combination comprising a register, denominationally arranged racks for actuating said register, a flexible support, means for guiding said support laterally relative to said racks, a plurality of denominationally arranged stop slides carried by said support and movable thereby into different denominational relationships relative to said racks, said slides being differentially settable into different positions representative of different values, respectively, and adapted to arrest said racks in corresponding positions, an element forming a ledge underlying said slides, means for causing said racks to move to positions arrested by said slides, and means responsive to operation of said last-mentioned means and operable during movement of said racks for clamping said slides against said ledge.

8. In a calculating machine, the combination of a register, denominationally arranged racks for actuating said register, a pair of spaced drum elements, means supporting said drum elements for rotation, a flexible belt extending around and carried by said drum elements, a plurality of denominationally arranged stop slides carried by said belt and movable thereby into different denominational relationships relative to said racks, means for causing said racks to set said slides into different positions representative of different values, respectively, a stationary element forming a ledge underlying said stop slides, means for causing said racks to move to positions arrested by said stop slides, and means responsive to operation of said last-mentioned means and operable during movement of said racks for clamping said slides against said ledge.

9. In a calculating machine, the combination of a register, denominationally arranged differential actuators for said register, denominationally arranged amount storage devices cooperable with said actuators and adapted to differentially control said actuators, means comprising a manually adjustable element movable into any of a plurality of different positions for adjusting said devices into different denominational relationships, respectively, relative to said actuators, cyclically operable operating mechanism, a control device including said manually adjustable element settable into either of two conditions when in any of said positions for causing said cyclically operable mechanism to operate said actuators to drive said register in a additive direction or in a subtractive direction, respectively; and means whereby said manually adjustable element may be moved from one of said conditions to the other during a cycle of said operating mechanism.

10. In a calculating machine, the combination of a register, denominationally arranged differential actuators for said register, denominationally arranged amount storage devices cooperable with said actuators and adapted to differentially control said actuators, means comprising a manually adjustable element movable into any of a plurality of different positions for adjusting said devices into different denominational relationships, respectively, relative to said actuators, cyclically operable operating mechanism, a control mechanism settable into either of two conditions for causing said cyclically operable mechanism to operate said actuators to drive said register in an additive direction or in a subtractive direction, respectively; means for maintaining said control mechanism in a set one of said conditions during a cycle of said cyclically operable mechanism, a yieldable connection between said manually adjustable element and said control mechanism, said element being settable into either of two conditions when in any of said positions thereof whereby to set said control mechanism into either of said two conditions thereof.

11. The combination according to claim 10 comprising means responsive to movement of said manually adjustable element into one of said conditions thereof for holding said element therein throughout a portion only of an ensuing cycle of said cyclically operable mechanism.

12. In a calculating machine, the combination comprising a register, denominationally arranged longitudinally movable racks for actuating said register, value selecting devices for differentially controlling movement of said racks, denominationally arranged stop elements movable parallel to the racks, said stop elements being settable into different differential positions by said racks and selectively adapted in said positions to control movement of said racks into different differential positions, a denominationally shiftable support for supporting said stop elements in cooperative denominational relation with adjacent ones of said racks, manually operable means movable in either direction from an initial intermediate position to any of a plurality of positions for moving said support from an initial intermediate position to any of a plurality of corresponding denominational positions whereby to move said stop elements into cooperative relation with different ones of said racks, means controlled by said manually operable means in any of said plurality of positions for causing operation of said racks, and means for automatically returning said support to said initial position from any other position thereof.

References Cited in the file of this patent

UNITED STATES PATENTS

| | | |
|---|---|---|
| 605,909 | Peters | June 21, 1898 |
| 978,111 | Callahan | Dec. 6, 1910 |
| 1,120,746 | Rinsche | Dec. 15, 1914 |
| 1,166,978 | Fuhrmann | Jan. 4, 1916 |
| 1,416,974 | Piscicelli | May 23, 1922 |
| 1,475,944 | Grogel et al. | Dec. 4, 1923 |
| 1,624,104 | Landsiedel | Apr. 12, 1927 |
| 2,034,345 | Kottmann | Mar. 17, 1936 |
| 2,255,622 | Landsiedel | Sept. 9, 1941 |
| 2,374,333 | Crosman | Apr. 24, 1945 |
| 2,377,065 | Avery | May 23, 1945 |
| 2,393,018 | Boyden | Jan. 15, 1946 |
| 2,545,649 | Capellaro | Mar. 20, 1951 |
| 2,581,624 | Boyden et al. | Jan. 8, 1952 |
| 2,620,979 | Gang | Dec. 9, 1952 |
| 2,656,980 | Fox | Oct. 27, 1953 |
| 2,658,684 | Gang | Nov. 10, 1953 |
| 2,678,162 | Hutton | May 11, 1954 |

FOREIGN PATENTS

| | | |
|---|---|---|
| 988,615 | France | May 9, 1951 |